(12) United States Patent
Proctor, Jr. et al.

(10) Patent No.: US 8,619,837 B2
(45) Date of Patent: Dec. 31, 2013

(54) USE OF ADAPTIVE ANTENNA ARRAY IN CONJUNCTION WITH AN ON-CHANNEL REPEATER TO IMPROVE SIGNAL QUALITY

(75) Inventors: James A. Proctor, Jr., Melbourne Beach, FL (US); Kenneth M. Gainey, Satellite Beach, FL (US); James C. Otto, West Melbourne, FL (US)

(73) Assignee: QUALCOMM Incorporated, San Diego, CA (US)

( * ) Notice: Subject to any disclaimer, the term of this patent is extended or adjusted under 35 U.S.C. 154(b) by 1227 days.

(21) Appl. No.: 12/041,615

(22) Filed: Mar. 3, 2008

(65) Prior Publication Data

US 2008/0225931 A1 Sep. 18, 2008

Related U.S. Application Data

(60) Provisional application No. 60/904,368, filed on Mar. 2, 2007.

(51) Int. Cl.
*H04B 3/36* (2006.01)

(52) U.S. Cl.
USPC ........... 375/211; 375/260; 375/214; 375/212; 375/213; 375/215; 370/315; 370/310; 370/276; 370/328; 370/355; 370/491; 455/8; 455/7

(58) Field of Classification Search
USPC ................. 375/260, 211, 214, 212, 213, 215; 370/315, 310, 276, 328, 355, 491; 455/7, 8
See application file for complete search history.

(56) References Cited

U.S. PATENT DOCUMENTS 4,471,357 A 9/1984 Wu et al.
4,706,239 A 11/1987 Ito et al.
(Continued)

FOREIGN PATENT DOCUMENTS

| CN | 2465405 Y | 12/2001 |
|---|---|---|
| EP | 1039716 | 9/2000 |

(Continued)

OTHER PUBLICATIONS

Amihai, Koo: "Design of Multiplierless FIR Digital Filters With Two to the N th Power Coefficients" IEEE Transactions on Consumer Electronics, vol. 52, No. 3, Aug. 1987, pp. 109-114, XP011158561.

(Continued)

*Primary Examiner* — Zewdu Kassa
(74) *Attorney, Agent, or Firm* — Linda G. Gunderson

(57) ABSTRACT

A repeater environment is provided to deploy a feedback cancellation loop that is adaptively coupled with an antenna array such that a selected metric can be derived by deploying a one or more of selected metrics (e.g., composite metrics) 5 comprising a selected filter bank operative to process the signal on a bin by bin basis and the derived metric can be applied to the antenna array and feedback cancellation loop combination to improve signal integrity and amplification, beam forming operations, and pilot control and overhead channel control operations. In an illustrative implementation, an exemplary repeater environment comprises, a 10 transmitter, a receiver, an equalized feedback cancellation loop circuitry comprising a filter bank, the cancellation loop being operatively coupled to an antenna array. In the illustrative implementation, the feedback cancellation loop can receive signals as input from a cooperating antenna array and provide output signals such as a feedback leakage signal to a cooperating.

19 Claims, 25 Drawing Sheets

(56) References Cited

U.S. PATENT DOCUMENTS

| | | | |
|---|---|---|---|
| 4,776,032 A | 10/1988 | Odate et al. | |
| 5,265,150 A | 11/1993 | Helmkamp et al. | |
| 5,745,523 A | 4/1998 | Dent et al. | |
| 5,802,452 A | 9/1998 | Grandfield et al. | |
| 5,819,177 A | 10/1998 | Vucetic et al. | |
| 6,141,332 A | 10/2000 | Lavean | |
| 6,151,296 A | 11/2000 | Vijayan et al. | |
| 6,163,572 A | 12/2000 | Velez et al. | |
| 6,256,506 B1 | 7/2001 | Alexander, Jr. et al. | |
| 6,339,694 B1 | 1/2002 | Komara et al. | |
| 6,445,904 B1 | 9/2002 | Lovinggood et al. | |
| 6,697,603 B1 | 2/2004 | Lovinggood et al. | |
| 6,731,904 B1 | 5/2004 | Judd | |
| 6,745,003 B1 | 6/2004 | Maca et al. | |
| 6,785,513 B1 | 8/2004 | Sivaprakasam | |
| 6,889,033 B2 | 5/2005 | Bongfeldt | |
| 6,934,511 B1 | 8/2005 | Lovinggood et al. | |
| 6,990,313 B1 | 1/2006 | Yarkosky | |
| 7,027,770 B2 | 4/2006 | Judd et al. | |
| 7,035,587 B1 | 4/2006 | Yarkosky | |
| 7,068,973 B1 | 6/2006 | Lovinggood et al. | |
| 7,088,953 B2 | 8/2006 | Bongfeldt | |
| 7,130,875 B2 | 10/2006 | Abe | |
| 7,263,293 B2 | 8/2007 | Ommodt et al. | |
| 7,333,771 B2 | 2/2008 | Maxwell | |
| 7,907,513 B2 | 3/2011 | Proctor, Jr. et al. | |
| 7,907,891 B2 | 3/2011 | Proctor, Jr. et al. | |
| 7,911,985 B2 | 3/2011 | Proctor, Jr. et al. | |
| 8,116,239 B2 | 2/2012 | Proctor, Jr. et al. | |
| 8,121,535 B2 | 2/2012 | Proctor, Jr. et al. | |
| 2003/0022626 A1* | 1/2003 | Miquel et al. | 455/24 |
| 2003/0124976 A1* | 7/2003 | Tamaki et al. | 455/15 |
| 2004/0001464 A1* | 1/2004 | Adkins et al. | 370/335 |
| 2004/0110469 A1* | 6/2004 | Judd et al. | 455/15 |
| 2004/0125895 A1* | 7/2004 | Buckley et al. | 375/340 |
| 2004/0147221 A1 | 7/2004 | Sheynblat et al. | |
| 2005/0068226 A1 | 3/2005 | Shinonaga et al. | |
| 2005/0190822 A1 | 9/2005 | Fujii et al. | |
| 2005/0215193 A1 | 9/2005 | Kummetz | |
| 2006/0030262 A1 | 2/2006 | Anderson et al. | |
| 2006/0077920 A1* | 4/2006 | Kilfoyle et al. | 370/315 |
| 2006/0098592 A1 | 5/2006 | Proctor Jr. et al. | |
| 2006/0109891 A1 | 5/2006 | Guo et al. | |
| 2006/0195883 A1 | 8/2006 | Proctor, Jr. et al. | |
| 2006/0205343 A1 | 9/2006 | Runyon et al. | |
| 2006/0209931 A1 | 9/2006 | Moshavi et al. | |
| 2006/0264174 A1 | 11/2006 | Moss | |
| 2007/0041440 A1 | 2/2007 | Schoenbeck et al. | |
| 2007/0109962 A1 | 5/2007 | Leng et al. | |
| 2008/0225929 A1 | 9/2008 | Proctor et al. | |
| 2008/0311863 A1 | 12/2008 | Nishio | |
| 2009/0239521 A1* | 9/2009 | Mohebbi | 455/422.1 |
| 2011/0002367 A1 | 1/2011 | Kummetz | |

FOREIGN PATENT DOCUMENTS

| | | |
|---|---|---|
| EP | 1324514 A2 | 7/2003 |
| EP | 1558045 A1 | 7/2005 |
| EP | 1912348 A1 | 4/2008 |
| JP | 63079429 | 4/1988 |
| JP | 1188117 | 7/1989 |
| JP | 7066775 | 3/1995 |
| JP | 8008807 A | 1/1996 |
| JP | 9036787 A | 2/1997 |
| JP | 11112402 A | 4/1999 |
| JP | 2000077926 A | 3/2000 |
| JP | 2000286772 | 10/2000 |
| JP | 2000341243 | 12/2000 |
| JP | 2001007750 | 1/2001 |
| JP | 2001223628 | 8/2001 |
| JP | 2001511960 | 8/2001 |
| JP | 2001285167 | 10/2001 |
| JP | 2001518739 | 10/2001 |
| JP | 2001309421 | 11/2001 |
| JP | 2002300094 | 10/2002 |
| JP | 2003060616 | 2/2003 |
| JP | 2003087217 | 3/2003 |
| JP | 2003523690 | 8/2003 |
| JP | 2003273831 | 9/2003 |
| JP | 2004048197 A | 2/2004 |
| JP | 2004048202 | 2/2004 |
| JP | 2004328666 | 11/2004 |
| JP | 2005039336 | 2/2005 |
| JP | 2005223599 | 8/2005 |
| JP | 2005236626 | 9/2005 |
| JP | 2006020211 A | 1/2006 |
| JP | 2006506033 | 2/2006 |
| JP | 2006060498 | 3/2006 |
| JP | 4768184 | 6/2011 |
| KR | 20010087979 A | 9/2001 |
| KR | 20070120614 A | 12/2007 |
| KR | 2009113918 | 11/2009 |
| KR | 2009115981 | 11/2009 |
| RU | 2128886 | 4/1999 |
| RU | 2195784 C2 | 12/2002 |
| RU | 2196392 C2 | 1/2003 |
| RU | 2216873 | 11/2003 |
| RU | 2004135329 | 6/2005 |
| SU | 961103 A1 | 9/1982 |
| SU | 987804 A1 | 1/1983 |
| SU | 1226485 A1 | 4/1986 |
| WO | WO9410779 | 5/1994 |
| WO | WO9829962 A2 | 7/1998 |
| WO | WO9917476 | 4/1999 |
| WO | WO9966643 A2 | 12/1999 |
| WO | WO0126248 | 4/2001 |
| WO | 02054628 | 7/2002 |
| WO | WO03093859 A1 | 11/2003 |
| WO | WO2004045110 | 5/2004 |
| WO | WO2006011360 | 2/2006 |
| WO | WO2006094037 A2 | 9/2006 |
| WO | WO2006099209 | 9/2006 |
| WO | WO2006099525 A1 | 9/2006 |
| WO | WO2007015349 A1 | 2/2007 |

OTHER PUBLICATIONS

Chen, et al., "Transmission Filters With Multiple Flattened Passbands Based on Chirped Moire Gratings" IEEE Photonics Technology Letters, vol. 10, No. 9, Sep. 1998, XP011046212.

Dorot, V., et al., "An Explanatory Dictionary of Modern Computer Terms," 2nd Edition, BHV-Petersburg Publishers, Saint Petersburg, 2001, 'Program Product' on p. 339.

Juseop Lee, Sarabandi: "Design of Triple-Passband Microwave Filters Using Frequency Transformations" IEEE Transactions on Microwave Theory and Techniques, vol. 56, No. 1, Jan. 2008, pp. 187-193, XP011198986.

Macchiarella, Tamiallo: "Design techniques for dual-passband filters" IEEE Transactions on Microwave Theory and Techniques, vol. 53, No. 11, Nov. 2005, pp. 3265-3271, XP001512574.

Written Opinion—PCT/US2008/055734, International Search Authority, European Patent Office, Mar. 3, 2008.

Taiwan Search Report—TW097107364—TIPO—Mar. 23, 2012.

\* cited by examiner

Next, a second cross correlation between the reference signal, and the output of the cancellation is performed.

Looks like the leakage is removed well. It appears that the cross correlations are removed as well, leaving a lower signal.

$$ISO_{Antenna}(n,i) = Pout(n-1,i) - PCL(n,i)$$

Where;    $ISO_{Antenna}$ is the isolation from Tx out to input to canceller per block per frequency bin
          $Pout$ is the actual power transmitted in each bin
          $PCL$ is the Pre Cancellation Leakage
          $n$ equals current block
          $i$ equals frequency bin $$ISO_{Composite}(n,i) = Pout(n-1,i) - RL(n,i)$$

Where;    $ISO_{Composite}$ is the total isolation (antenna isolation plus canceller isolations)
          $RL$ is the residual leakage after cancellation

FIG. 15

USE OF ADAPTIVE ANTENNA ARRAY IN CONJUNCTION WITH AN ON-CHANNEL REPEATER TO IMPROVE SIGNAL QUALITY

CLAIM OF PRIORITY

This application claims priority to U.S. Provisional Patent Application Ser. No.: 60/904,368, filed on Mar. 2, 2007, entitled, "ADAPTIVE SAME FREQUENCY REPEATER TECHNIQUES," which is herein incorporated by reference in its entirety.

BACKGROUND

Conventionally, the coverage area of a wireless communication network such as, for example, a Time Division Duplex (TDD), Frequency Division Duplex (FDD) Wireless-Fidelity (Wi-Fi), Worldwide Interoperability for Microwave Access (Wi-max), Cellular, Global System for Mobile communications (GSM), Code Division Multiple Access (CDMA), or 3G based wireless network can be increased by a repeater. Exemplary repeaters include, for example, frequency translating repeaters or same frequency repeaters which operate in a physical layer or data link layer as defined by the Open Systems Interconnection Basic Reference Model (OSI Model).

Physical layer repeaters can be categorized into "same frequency" or "frequency translating" devices. The network architecture associated with where the repeater is going to be deployed will govern type of repeater used. If a same frequency repeater is used, this requires that the repeater receives and transmits on the same frequency concurrently. Accordingly, the repeater must achieve isolation between the receiver and transmitter using various antenna and digital/analog cancellation techniques. If a frequency translating repeater is used, the repeater receives a signal on a first frequency channel and then translates that to a second frequency channel for concurrent transmission. In this manner, isolation between the transmitter and receiver is achieved to a certain extent through frequency separation. Preferably, the antennas for receiving and transmitting as well as repeater circuitry are included within a same packaging in order to achieve manufacturing cost reductions, ease of installation, or the like. This is particularly the case when the repeater is intended for use by a consumer as a residential or small office based device where form factor and ease of installation is an important consideration. In such device, one antenna or set of antennas usually face, for example, a base station, access point, gateway, or another antenna or set of antennas facing a subscriber device.

For a repeater which receives and transmits concurrently, isolation between the receiving and transmitting antennas is a significant factor in overall repeater performance—this is the case whether repeating to the same frequency or repeating to a different frequency. More particularly, if the receiver and the transmitter antennas are not isolated properly, performance of the repeater can significantly deteriorate. Generally, gain of the repeater cannot be greater than the isolation to prevent repeater oscillation or initial de-sensitization. Isolation is generally achieved by physical separation, antenna patterns, or polarization. For frequency translating repeaters, additional isolation may be achieved utilizing band pass filtering, but antenna isolation generally remains a limiting factor in the repeater's performance due to unwanted noise and out of band emissions from the transmitter being received in the receiving antenna's in-band frequency range. The antenna isolation from the receiver to transmitter is an even more critical problem with repeaters operating on same frequencies and where band pass filtering does not provide additional isolation.

Often cellular based systems have limited licensed spectrum available and cannot make use of frequency translating repeating approaches and therefore use repeaters utilizing the same receive and transmit frequency channels.

As mentioned above, for a repeater intended for use with consumers, it would be preferable to manufacture the repeater to have a physically small form factor in order to achieve further cost reductions, ease of installation, and the like. However, small form can result in antennas disposed in close proximity, thereby exasperating the isolation problem discussed above.

Current repeaters suffer an additional significant drawback in that they are not capable of separating leakage from their own transmitters from the signal they wish to repeat. As a result, conventional repeaters typically cannot optimize system isolation and performance on real time bases resulting in poor operation or destructive effects to overall network performance. Specifically, current practices do not allow for adaptive cancellation of unwanted signals in repeater environments while allowing the repeater to operate generally. Instead, current repeater deployments offer limited cancellation loops due to cost and complexity, are discrete implementations, and generally deployed in single band systems with no sub-band filtering. Further, current deployments of interference cancellation loops assume multipath delays and suffer from excess or unmatched delay in scattered signals, changing delays in signals (e.g., Doppler), and limited cancellation for wide band signals (e.g., ICs bandwidth).

From the foregoing, it is readily apparent that there exists a need for systems and methods to overcome the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Current practices do not consider use of an adaptive antenna array with a canceller module and with a composite metric (e.g., derived from other available repeater/system metrics) as part of an optimization process to optimize weighting settings for the antenna array as part of cancellation operations. With use of an adaptive antenna array, with a canceller, and composite metrics, the array weights can be optimized looking "through" the canceller module and allow for a joint optimization of the cancellation and array weights.

The herein described systems and methods provide for a repeater environment operative to deploy an adaptive antenna array such that a selected composite metric can be derived, the repeater environment comprising a selected filter bank operative to process the signal on a bin by bin basis and the derived metric can be applied to the antenna array and feedback cancellation loop combination to improve signal integrity and amplification, beam forming operations, and pilot control and overhead channel control operations. In an illustrative implementation, an exemplary repeater environment comprises, a transmitter, a receiver, a composite metric module, operatively coupled to an antenna array.

In an illustrative operation, an exemplary repeater environment can operatively perform a recursive method wherein a set of time series of post cancellation receive frequency bins, or the time series of post cancellation receive signal associated with the desired carrier signal frequency channel is used in a correlation with the associated pilot PN sequence in such a PN code phase that the maximum correlation is achieved to produce Ec; a set of time series of post cancellation receive frequency bins, or the time series of post cancellation receive signal associated with the desired carrier signal frequency channel is used in a correlation with the associated pilot PN sequence in such a PN code phase that is at least several samples miss aligned from the peak correlation such that the average interference is measured I; dividing Ec by Io to obtain Ec/Io; calculating a residual leakage correlation metric; samples of N Transmitters transmitted N Weighted Repeater Transmit Signals are used to determine Pout (e.g., illustratively expressed as the sum of the mean squared averages of each of the array signals which is the total power transmitted); calculating a metric based on the Ec, Io, Pout, and residual leakage (last block) measured/calculated values; applying the steepest decent adaptive algorithm (LMS, RLS, or Perturbational) to modify the spatial weight settings to optimize the metric in one adaptive loop iteration as new weights are produced.

In accordance with an aspect, a repeater for a wireless communication network, the repeater operative to provide feedback cancellation comprises: an antenna array comprising one or more antenna elements; and a metric module comprising one or more of a filter bank, beam former, and/or feedback cancellation loop operative as part of one or more selected pilot pollution control operations.

In accordance with yet another aspect, a method that facilitates feedback loop cancellation in a repeater environment comprises a metric module operative to perform one or more metrics performed by an equalized feedback cancellation loop, filter bank, and beam former. The metric module operative to comprise a method comprising: receiving repeater transmitter leakage signal and receive signal at M number of receivers; storing the received signals as Ns number of time samples; performing a fast Fourier transform (FFT) on the received blocks to generate FFT bins; applying M number of complex spatial receive weights on the M number of receivers to generate weighted receiver signals on a bin by bin basis for the FFT bins; combining the weighted receiver signals to generate a composite weighted signal; producing a post-cancellation receive frequency bin for use in generating automatic gain control output frequency bins; applying spatial weighting to the AGC output frequency bins to produce weighted transmit frequency bin arrays; performing an inverse FFT on the transmit frequency bins to produce N time domain series that are transmitted to M receivers and summed with the desired receive signal at the M receivers for cancellation.

In accordance with an aspect, a computer readable medium has stored thereon computer executable instructions for performing at least the following acts: receiving repeater transmitter leakage signal and receive signal at M number of receivers from an adaptive antenna array; storing the received signals as Ns number of time samples; performing an fast Fourier transform (FFT) on the received blocks to generate FFT bins; applying M number of complex spatial receive weights on the M number of receivers to generate weighted receiver signals on a bin by bin basis for the FFT bins; combining the weighted receiver signals to generate a composite weighted signal; producing a post-cancellation receive frequency bin for use in generating automatic gain control output frequency bins; applying spatial weighting to the AGC output frequency bins to produce weighted transmit frequency bin arrays; performing an inverse FFT on the transmit frequency bins to produce time domain series that are transmitted to M receivers and summed at the M receivers for cancellation.

In another aspect, a processor, comprising a memory having stored thereon computer executable instructions to cause the processor to performing at least the following acts: receiving repeater transmitter leakage signal and receive signal at M number of receivers from an adaptive antenna array; storing the received signals as Ns number of time samples; performing a fast Fourier transform (FFT) on the received blocks to generate FFT bins; applying M number of complex spatial receive weights on the M number of receivers to generate weighted receiver signals on a bin by bin basis for the FFT bins; combining the weighted receiver signals to generate a composite weighted signal; producing a post-cancellation receive frequency bin for use in generating automatic gain control output frequency bins; applying spatial weighting to the AGC output frequency bins to produce weighted transmit frequency bin arrays; performing an inverse FFT on the transmit frequency bins to produce time domain series that are transmitted to M receivers and summed at the M receivers for cancellation.

In yet another aspect, a system that facilitates feedback loop cancellation in a repeater environment comprise a means for receiving repeater transmitter leakage signal and receive signal at M number of receivers from an adaptive antenna array; a means for storing the received signals as Ns number of time samples; a means for performing a fast Fourier transform (FFT) on the received blocks to generate FFT bins; a means for applying M number of complex spatial receive weights on the M number of receivers to generate weighted receiver signals on a bin by bin basis for the FFT bins; a means for combining the weighted receiver signals to generate a composite weighted signal; a means for producing a post-cancellation receive frequency bin for use in generating automatic gain control output frequency bins; a means for applying spatial weighting to the AGC output frequency bins to produce weighted transmit frequency bin arrays; a means for performing an inverse FFT on the transmit frequency bins to produce time domain series that are transmitted to M receivers and summed at the M receivers for cancellation.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

BRIEF DESCRIPTION OF THE DRAWINGS

FIG. 15 is a block diagram of exemplary equations for use in calculation of exemplary signal weights for an adaptive antenna array using composite metrics in accordance with the herein described systems and methods.

DETAILED DESCRIPTION

Figure 1:
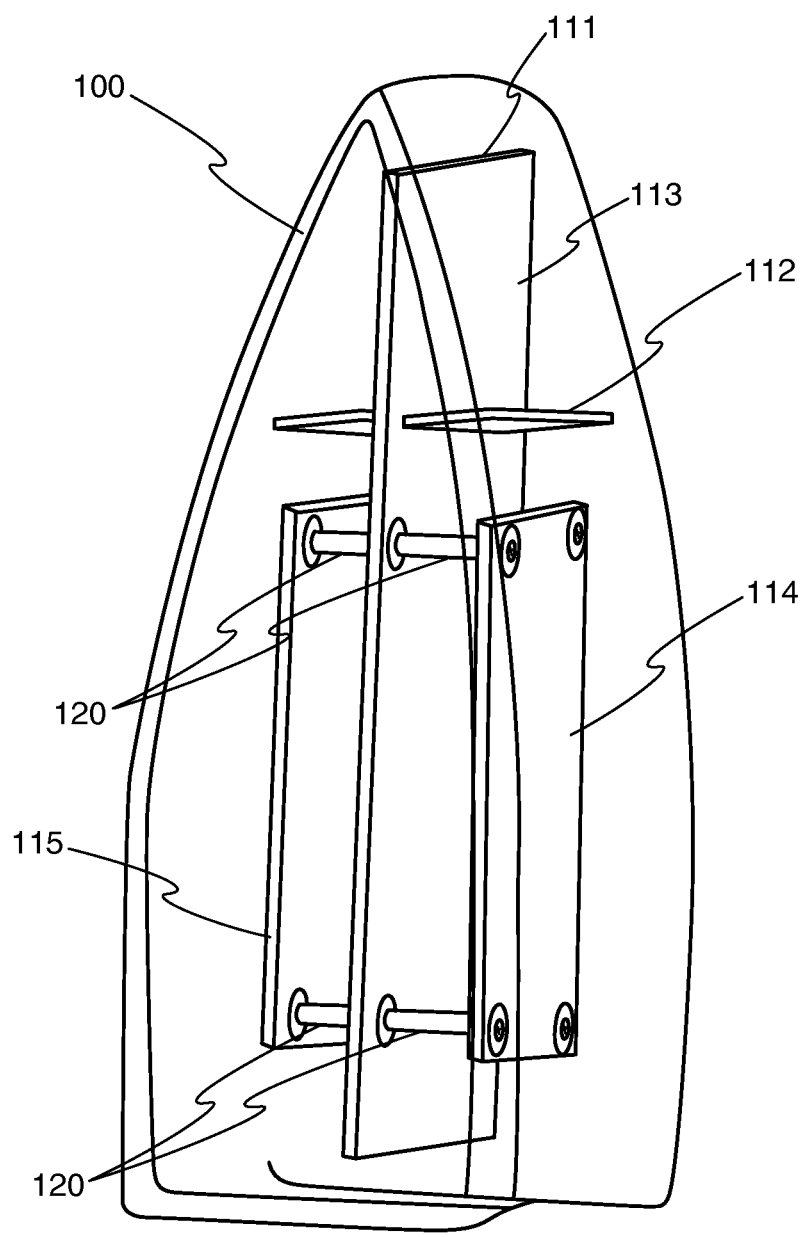
FIG. 1 is a block diagram of an exemplary enclosure of an illustrative repeater in accordance with the herein described systems and methods.

The current disclosure is related to the following U.S. patent applications filed on Mar. 3, 2008: PHYSICAL LAYER REPEATER UTILIZING REAL TIME MEASUREMENT METRICS AND ADAPTIVE ANTENNA ARRAY TO PROMOTE SIGNAL INTEGRITY AND AMPLIFICATION, Ser. No. 12/041,598; CLOSED FORM CALCULATION OF TEMPORAL EQUALIZER WEIGHTS USED IN A REPEATER TRANSMITTER LEAKAGE CANCELLATION SYSTEM, Ser. No.12/041,603; USE OF A FILTERBANK IN AN ADAPTIVE ON-CHANNEL REPEATER UTILIZING ADAPTIVE ANTENNA ARRAYS, Ser. No. 12/041,611; USE OF ADAPTIVE ANTENNA ARRAY IN CONJUNCTION WITH AN ON-CHANNEL REPEATER TO IMPROVE SIGNAL QUALITY Ser. No. 12/041,621; CONFIGURATION OF A REPEATER, Ser. No. 12/041,621; and SUPERIMPOSED COMPOSITE CHANNEL FILTER, Ser. No. 12/041,626, the contents of each of which are hereby incorporated by reference in their entirety, the contents of each of which are hereby incorporated by reference in their entirety.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments can be practiced without these specific details. In other instances, well-known structures and devices are shown in block diagram form in order to facilitate describing one or more embodiments.

In addition, various aspects of the present invention are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are descried in the context of boosting uplink pilot signals in a W-CDMA communications system. One skilled in the art should appreciate that similar techniques could apply to other communication environments.

As used in this application, the terms "component," "module," "system," and the like are intended to refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a wireless terminal or user equipment (UE). A wireless terminal or UE can also be called a system, subscriber unit, subscriber station, mobile station, mobile, mobile device, remote station, remote terminal, UE, user terminal, terminal, wireless communication device, user agent, or user device. A wireless terminal or UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with wireless terminal(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. Additionally it should be appreciated that a carrier wave can be employed to carry computer-readable electronic data or instructions such as those used in transmitting and receiving voice mail, in accessing a network such as a cellular network, or in instructing a device to perform a specified function. Accordingly, the term "machine-readable medium" refers to various physical media capable of storing, containing, and/or carrying instruction(s) and/or data (but does not refer to vacuum). Additionally, the herein described systems and methods can be deployed as machine readable medium as part of wireless channels capable of storing, containing, and/or carrying instructions and/or data. Of course, those skilled in the art will recognize many modifications may be made to the disclosed embodiments without departing from the scope or spirit of the invention as described and claimed herein.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA), TD-SCDMA, and TD-CDMA. cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the above techniques may be described below in the context of uplink pilot multiplexing as it applies to LTE, and as a result, 3GPP terminology may be used in much of the descriptions below, where appropriate.

Adaptive Antenna Array and Composite Metrics to Optimize Signal Weights used for Signal Cancellation in Repeater Environment:

Use of an antenna array with the canceller, and with a "composite" metric derived from other metrics available in the system, being used to improve or even optimize the array weighting settings are provided by the herein described systems and methods. The specific metrics being used can include Ec/Io, SNR, RSSI, Correlated Power, and specific isolation related metrics associated with the repeater operation. Other metric calculations can derive one or more metrics using an adaptive antenna array with the canceller. In an illustrative implementation, a steepest decent based adaptive algorithm can be used in conjunction with the post cancellation correlation metric as the primary component of the metric being minimized within the array. In this way the array weights can be optimized looking "through" the canceller, and therefore the cancellation and array weights can be jointly optimized.

By combining the "Residual Leakage Metric" (e.g., post cancellation correlation metric) with other metrics such as "Composite isolation", RSSI, SNR, or Ec/Io, outcomes of the antenna array adaptation can be influenced in the joint adaptation of the array with the canceller to achieve specific goals. A benefit that can be realized in using a composite metric approach is to avoid interference from other base stations. Another benefit is to increase the received signal level when low levels of signal are present. Again, the filter bank the operation may be performed on a bin by bin basis. The results of the weight calculations may be combined or averaged over a subset of frequency bins if the behavior of these sets of bins needs to be consistent. One such case where sets of specific antenna weights in frequency bins may need to be averaged together to generate a single joint result and shared result would be over a individual CDMA or WCDMA carrier.

An alternative to averaging the weights over the selected bins covering the specific carrier for which the new metric is being applied is to derive a "joint metric" component which provides the same feedback obtained for the common frequency bins. An example of this would be to perform a correlation of the signal represented by those frequency bins spanning, for instance, a CDMA2000 or a WCDMA carrier. The common metric component could be the energy of the correlated pilot channel (Ec) or the ratio of the correlated pilot energy Ec to the non-correlated energy (Io). This ratio is known as Ec/Io and is an indication of the quality of the signal from a specific base station. This metric is used in most CDMA systems. In OFDM based systems, a pilot carrier energy may be used, or a Pilot EVM or error vector magnitude as a representation of the signal quality.

In an illustrative implementation, in the case of a the non-filter bank approach, after the cancellation of the leakage signal, the desired signal may be digitally down converted, filtered and passed to a correlator. In this implementation, a "joint metric" component would be inherent in the process.

In another illustrative implementation, the specific frequency bins representing the desired signal can be collected and an inverse FFT (following the cancellation stage) can be performed, of a smaller size than the original FFT, to obtain the time samples for use with a correlator. In this implementation, a "joint metric" component would be inherent in the process as well.

In another illustrative implementation, a new type of correlation process on each of the individual frequency bins representing the desired carrier can be performed. Illustratively, an FFT of the sequence being used to perform the "groupwise" or entire carrier based correlation can be performed, but to correlate each bin individually based on each of the associated bins from this new FFT. The result can be individual correlated powers or "Ec" measurements. In this implementation, the correlations results could be used individually or summed together for a total result for a joint metric component.

In the illustrative implementations, the Io (Interference) is obtained by misaligning the correlator with the desired Pn alignment to obtain the cross correlation noise floor.

Illustratively, the antenna weights on the uplink based on the settings associated with the antenna weights on the down link to the base station can be considered as part of the metric calculation processes. If the array is being steered based on attempting to avoid adjacent cell interference, the weight selection can be impacted. To accommodate for this operational constraint, in an illustrative implementation, the uplink transmit weights (from the repeater to the base station) can be set to be the same as the downlink receive weights. This would be a reasonable approach when the Ec/Io term on the downlink dominates.

Further, when the isolation term on the uplink is sufficient, the weights used to maximize down link Ec/Io can be used on the uplink. In an illustrative implementation, the downlink array is a digital beam former, determining the weights to maximize Ec/Io can be achieved independent of which weights are actually applied to the down link signals.

Exemplary Repeater:

FIG. 1 illustrates an exemplary enclosure for an illustrative repeater in accordance with various aspects described herein. A dipole dual patch antenna configuration along with repeater electronics can be efficiently housed in a compact enclosure 100 as shown in FIG. 1. Structure of the enclosure 100 can be such that it can be intuitively oriented in at least one of two ways; however, instructions can guide a user in connection with placement of the enclosure to maximize signal reception. In the exemplary dipole dual patch antenna configuration, a ground plane 113, incorporated with a printed circuit board (PCB) for the repeater electronics can be arranged between and parallel to two patch antennas 114 and 115 using, for example, standoffs 120. An isolation fence 112 can be employed to improve isolation in many instances.

Each of the patch antennas 114 and 115 can be arranged, for example, parallel to the ground plane 113 and can be printed on wiring board or the like, can be constructed of a stamped metal portion embedded in a plastic housing, or can be fabricated differently. A planar portion of the PCB associated with the ground plane 113 can include a dipole antenna 111 configured, for example, as an embedded trace on the PCB. Typically, the patch antennas 114 and 115 are vertically polarized and the dipole antenna 111 is horizontally polarized, although other embodiments may be used.

A combination of non-overlapping antenna patterns and opposite polarizations can be utilized to achieve approximately 40 dB of isolation between the receiving and transmitting antennas in a dual dipole dual patch antenna. Particularly, one of the transmitter and the receiver uses one of two dual switched patch antennas having vertical polarization for communication with an access point, while the other of the of the transmitter and the receiver employs the dipole antenna having horizontal polarization. This approach would be particularly applicable when the repeater is meant to repeat an indoor network signals to indoor clients. In this case, pattern of the antennas transmitting to the clients would typically need to be generally omni-directional, requiring use of the dual dipole antennas, as direction to the clients is unknown.

Figure 2:
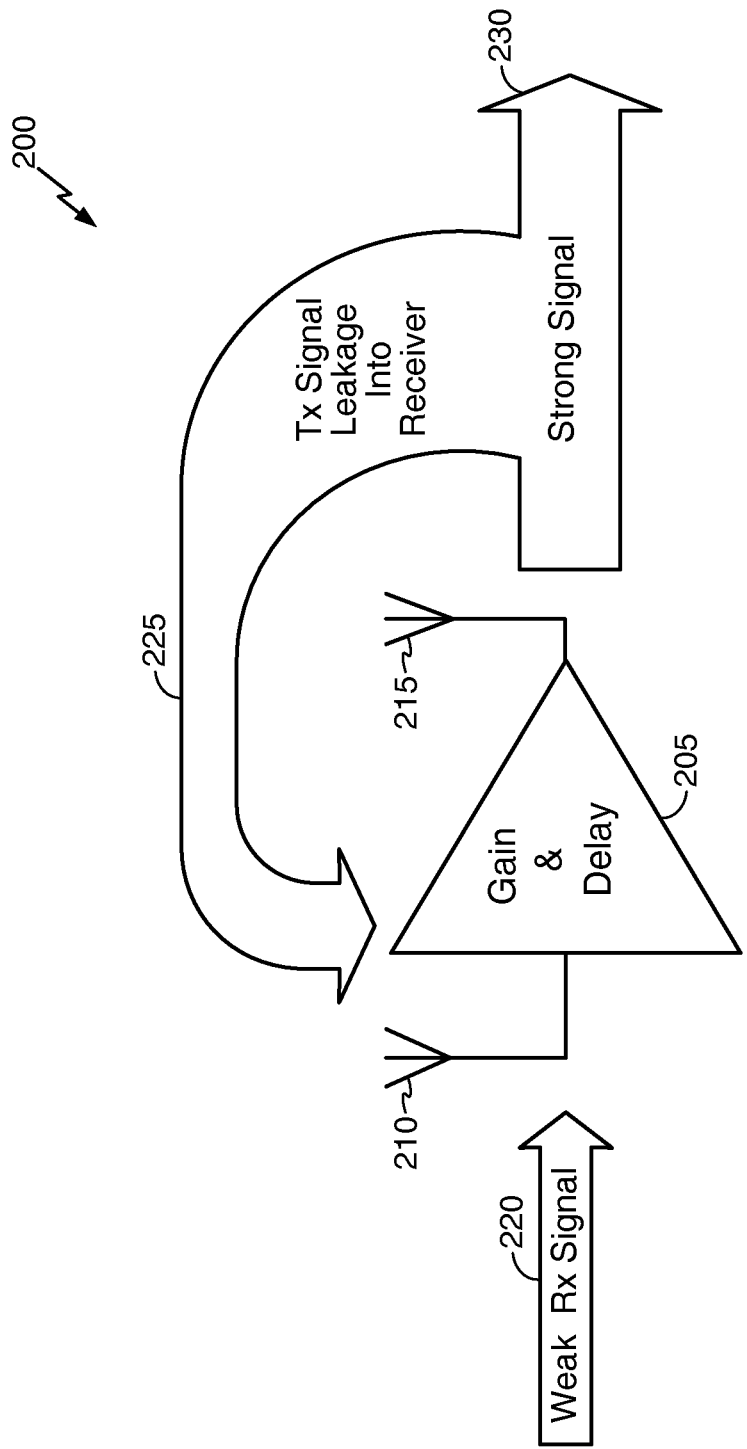
FIG. 2 is a block diagram of exemplary signal propagation for an exemplary RF repeater performing feedback cancellation in accordance with the herein described systems and methods.

FIG. 2 depicts an illustrative block diagram of an exemplary signal flow within illustrative repeater environment 200. As shown, a weak received signal (the desired received signal) 220 can be received by antenna element 210, and act as input to gain and delay component 205. Gain and delay component 205 can process the weak received signal 220 to produce strong signal 230 as an output from antenna element 215. Further, a transmit signal leakage into receiver 225 can also act as input to gain and delay 205 at antenna element 210 for use when processing the weak received signal 220 to generate strong signal 230. The transmit leakage signal into the receiver 225 can be generated by a feedback cancellation loop (not shown) operatively coupled to the antenna elements 210 and 215. That is, the feedback cancellation loop generates a signal to be transmitted by the repeater, some of which is received by receiver 225 as a transmit leakage signal.

Figure 3:
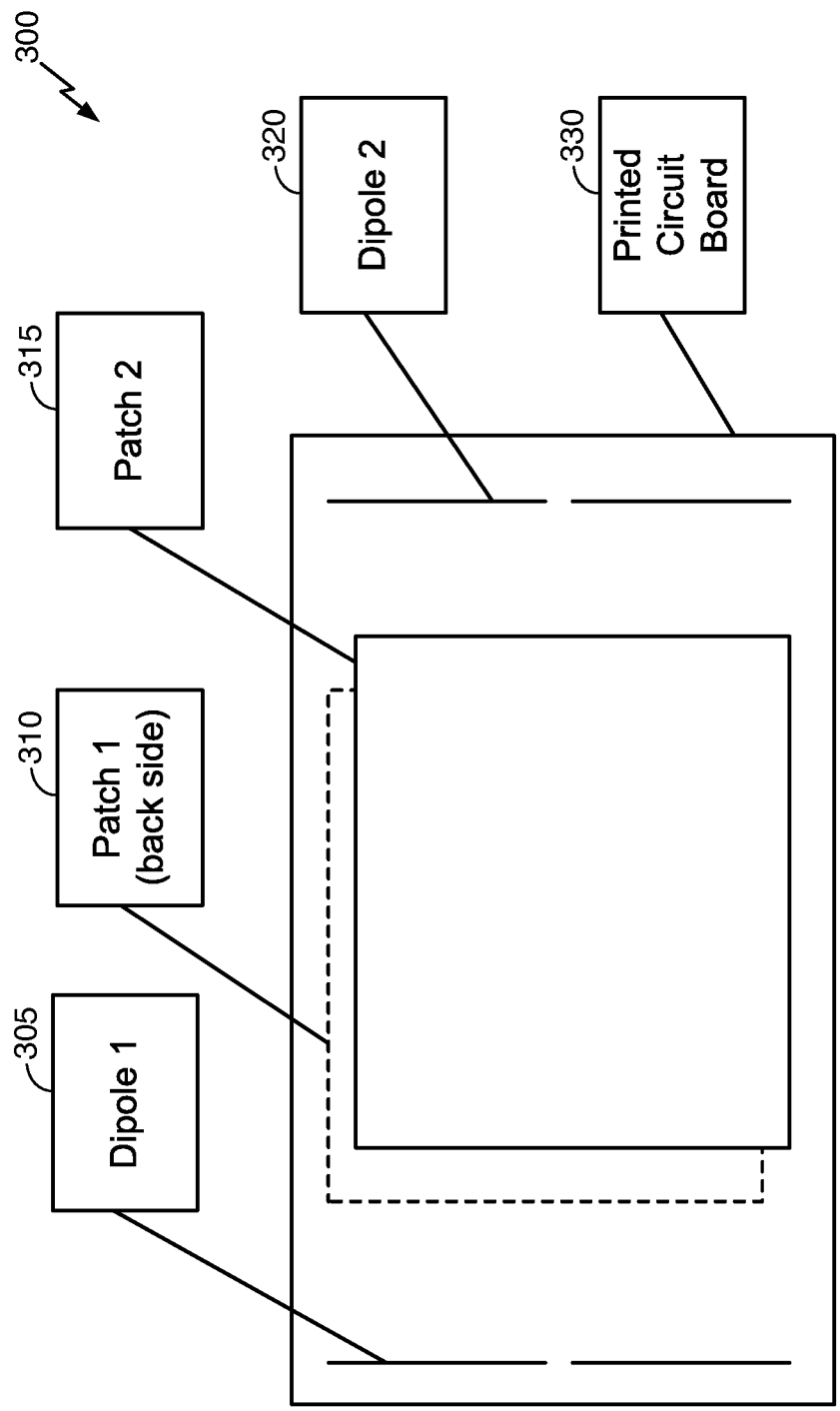
FIG. 3 is a block diagram of exemplary antenna repeater components in accordance with the herein described systems and methods.

FIG. 3 illustrates interaction of antenna elements of an exemplary repeater environment 300. Exemplary repeater environment 300 comprises printed circuit board 330 which includes dipole antennas 305 and 320, and further includes patch antennas 310 and 315. In an illustrative implementation, the dipole/patch antenna combination can achieve selected isolation between transmit and receive channels to allow for deployment of desired feedback cancellation. The antenna configuration of FIG. 3 is an example of a configuration of the antenna arrays that may be used in other embodiments described herein.

Figure 4:
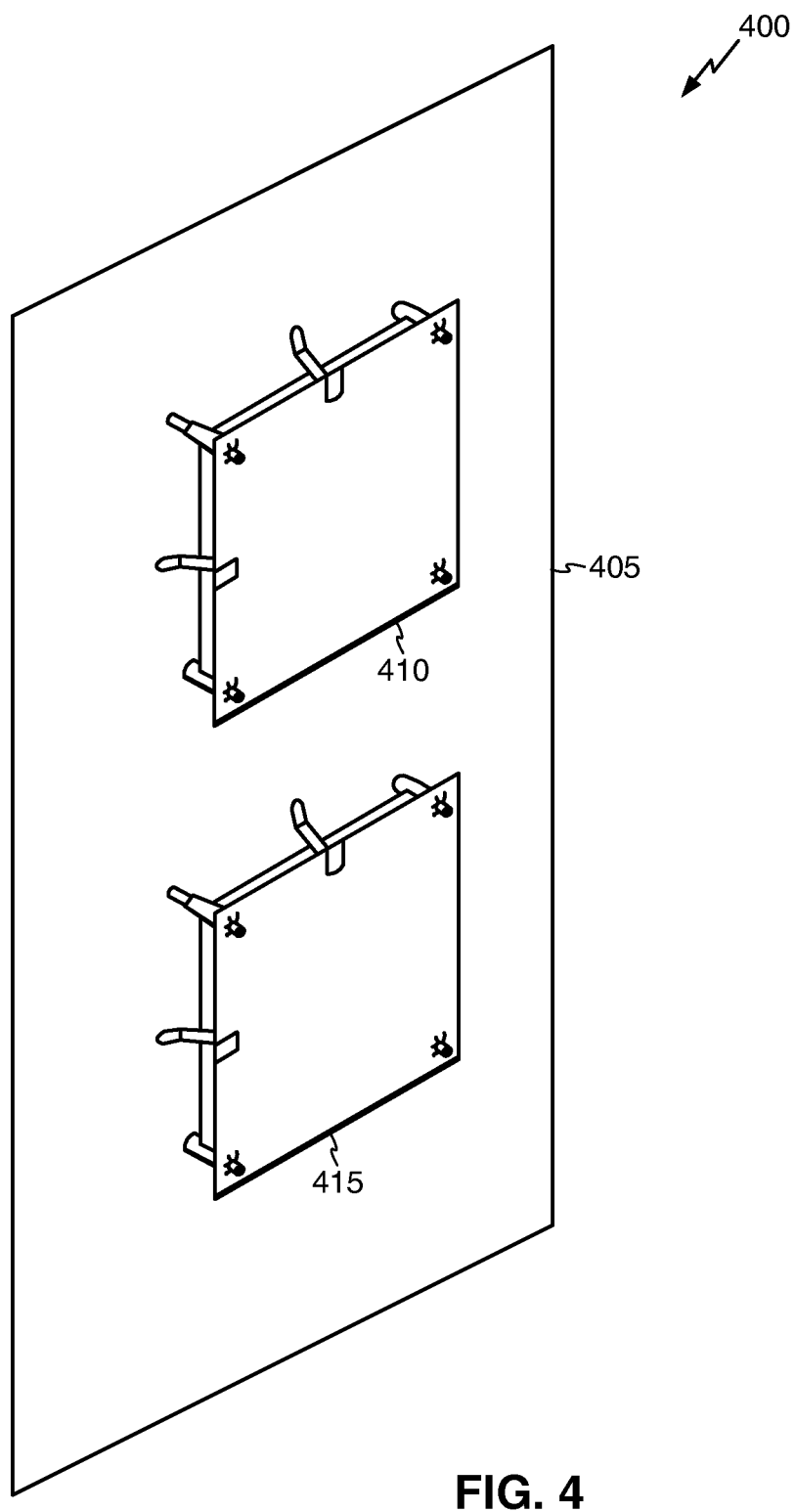
FIG. 4 is a block diagram of exemplary repeater components in accordance with the herein described systems and methods.

FIG. 4 illustrates one side of another antenna configuration for use in providing selected isolation for an exemplary repeater. Antenna configuration 400 comprises PCB board 405 having one or more patch antennas 410 and 415 mounted thereto Note that typically there would be a like number of antenna patches on the opposite side of PCB and typically orientated in an opposite or advantageous polarization when compared to the polarization of antennas 410 and 415, such that a sufficient or even maximum amount of isolation is achieved between the antennas on opposite sides of the PCB. In an illustrative implementation, PCB board 405 can comprise one or more patch antennas 410 and 415 in various configurations and have more than one pair of patch antennas as well as an uneven number of respective patch antennas that make up a superset thereof. Antenna configuration 400 can with the deployment of patch antennas 410 and 415 along with a like number of antenna on the opposite side of the PCB, provide selected isolation between a transmit and receive channel (e.g., transmit channels operatively coupled to one or more patch antennae and receive channels operatively coupled to one or more patch antennae) to cooperate with isolation and amplification provided by an exemplary cooperating feedback cancellation loop (e.g., feedback cancellation loop operatively coupled to an antenna array). The configuration of FIG. 4 shows another example of antenna arrays that can be used in embodiments described herein.

Figure 5:
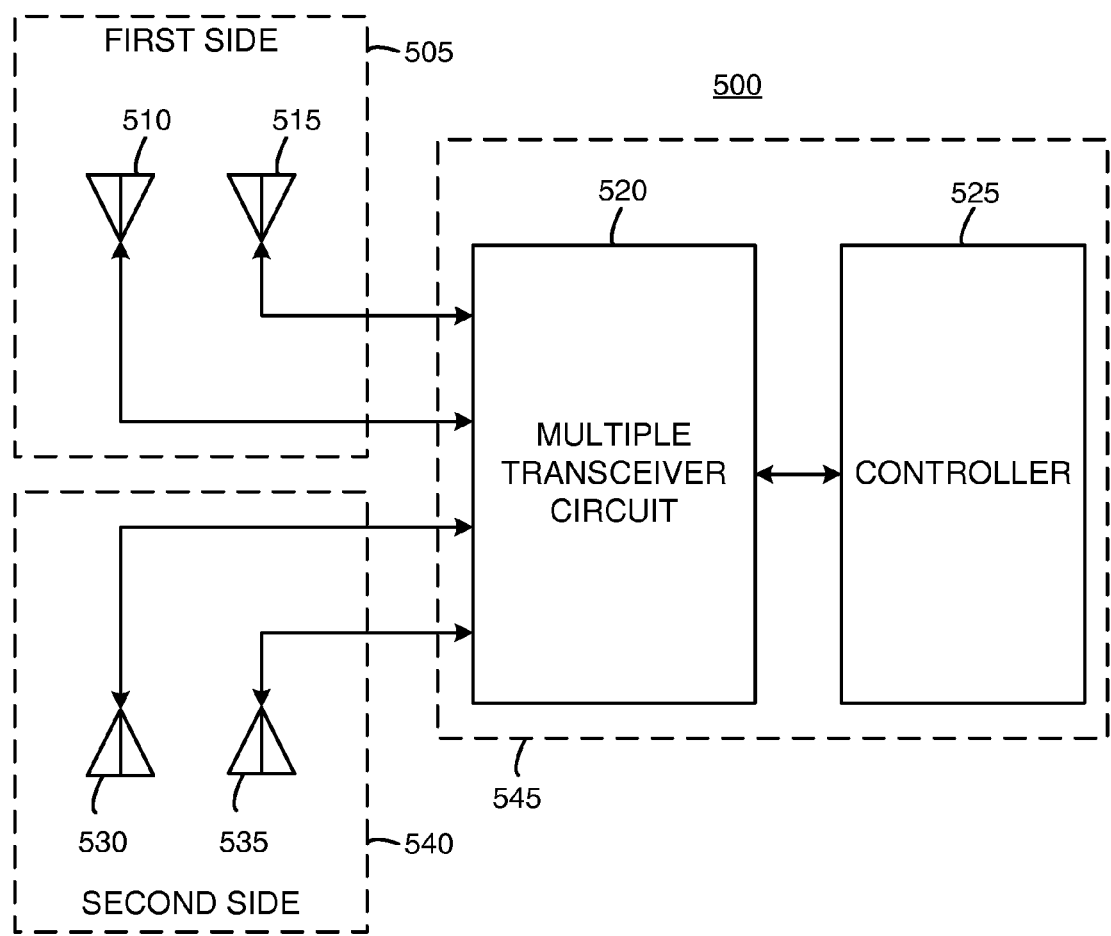
FIG. 5 is a block diagram of the cooperation of exemplary components of an illustrative RF repeater in accordance with the herein described systems and methods.

FIG. 5 shows exemplary repeater environment 500 operative to perform signal conditioning and amplification using one or more antenna arrays. Exemplary repeater environment 500 comprises a first antenna array 505 having antenna elements 510 and 515, second antenna array having antenna elements 530 and 535, processing circuitry 545 comprising multiple transceiver circuit 520 and controller 525. The antenna arrays 505 and 540 can cooperate with multiple transceiver circuit 520 which cooperates with controller 525 as part of operations of exemplary repeater environment 500. Signals can be received by antenna arrays 505 and 540 and passed to processing circuitry 545 for signal conditioning and processing and then passed back to antenna arrays 505 and 540 for communication with one or more cooperating components (e.g., base station of a CDMA wireless communications network).

In an illustrative implementation, antenna arrays 505 and 540 can comprise additional antenna elements as required to perform method(s) as described infra to achieve adaptive feedback cancellation realized by cooperation of one or more antenna arrays and the application of one or more metrics, such as one or more correlation results. Further, the number and configuration of the antenna arrays described herein are merely illustrative as the herein described systems and methods contemplate use of varying number of antenna arrays having varying configurations and comprising varying number of antenna elements.

Figure 6:
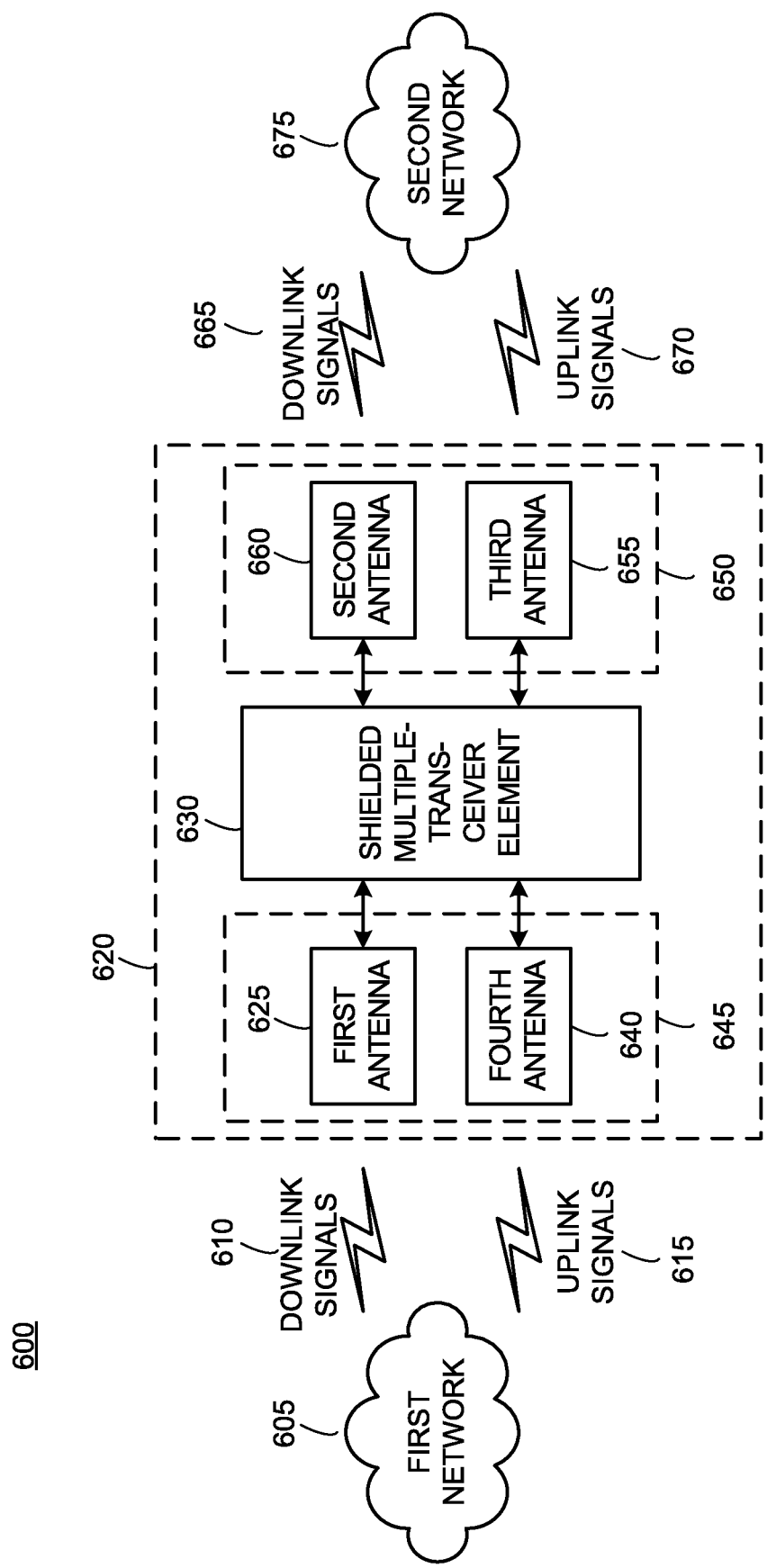
FIG. 6 is another block diagram of the cooperation of exemplary components of an illustrative RF repeater in accordance with the herein described systems and methods.

FIG. 6 illustrates interaction of exemplary repeater environment 600. Exemplary repeater environment 600 comprises processing circuitry 620 comprising antenna array 645 comprising first antenna 625 and fourth antenna 640, shielded multiple transceiver element 630, and antenna array 650 comprising second antenna element 660 and third antenna element 655. Operatively, downlink signals 610 originating from first network 605 can be processed by processing circuitry 620 to generate repeated downlink signals 665 for communication to second network 675, and uplink signals originating from second network 675 can be processed by processing circuitry 620 to generate repeated uplink signals 615 for communication to first network 605. Configuration and orientation of the antenna arrays 645 and 650 promote selected isolation of the unconditioned uplink and downlink signals provided to processing circuitry 620 and promote desired amplification and gain of such signals.

In an illustrative implementation, exemplary repeater environment 600 can comprise additional antenna elements as required to perform method(s) as described herein to achieve adaptive feedback cancellation realized by cooperation of one or more antenna arrays and the application of correlated metric. Further, it is appreciated that number and configuration of the antenna arrays described herein are merely illustrative as the herein described systems and methods contemplate use of varying number of antenna arrays having varying configurations and comprising varying number of antenna elements.

Figure 7:
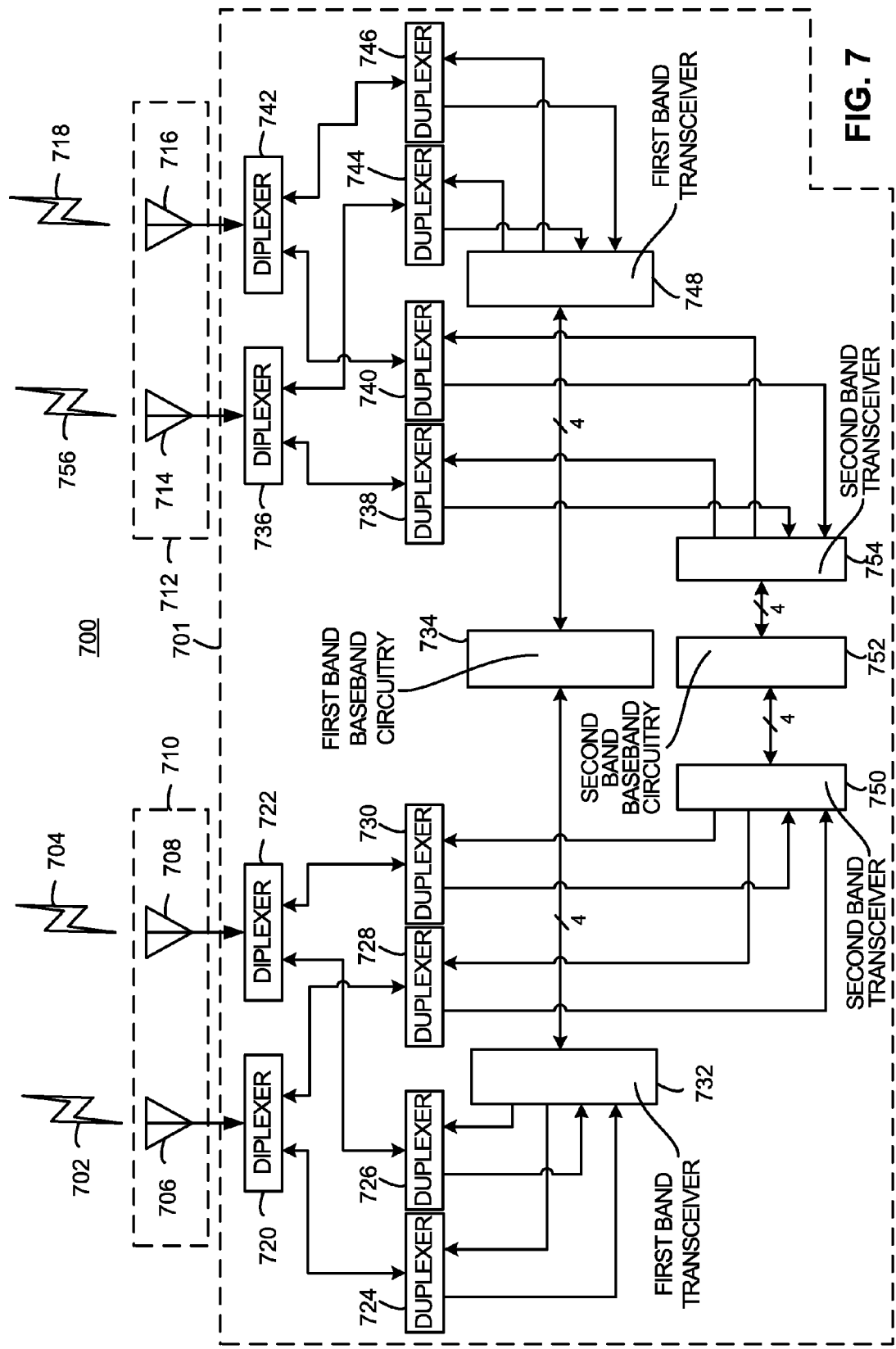
FIG. 7 is a block diagram of a frequency division duplexed (FDD) repeater having a dual band array in accordance with the herein described systems and methods.

FIG. 7 is a block diagram of a four-antenna, multiple-transceiver device 700 configured to operate in multiple bands in accordance with various illustrative implementations. This device 700 can transmit signals freely across two different bands using a variable configuration of the available antennae.

As shown in FIG. 7, the device 700 can include a shielded multiple-transceiver element 701 having a first side 710 and a second side 712. The shielded multiple-transceiver element 701 includes first band transceivers 732 and 748, first band baseband circuitry 734, second band transceivers 750 and 754, second band baseband circuitry 752, duplexers 724, 726, 728, 730, 738, 740, 744, and 746; diplexers 720, 722, 736, and 742; the first side 710 includes antennae 706 and 708; and the second side 712 includes antennae 714 and 716. Although not shown, the device 700 includes at least one electromagnetic isolation element, as described above, providing electromagnetic (EM) isolation between the antennae 706 and 708 on the first side 710, and the antennae 714 and 716 on the second side 712.

Illustratively, the antenna 706 can send or receive signals 702; the antenna 708 can send or receive signals 704; the antenna 714 can send or receive signals 756; and the antenna 716 can send or receive signals 718. These antennae 706, 708, 714, and 716 may be planar (e.g., patch) antennae, or any other desirable antenna types that may be effectively isolated from each other.

The first band transceiver 732 is connected to the antennae 706 and 708 through the duplexers 724, 726, 728, and 730, and the diplexers 720, and 722 to send or receive data via the antennae 706 and 708. The first band transceiver 748 is connected to antennae 714 and 742 through duplexers 738, 740, 744, and 746, and diplexers 736, and 742 to send or receive data via antennae 714 and 716. The first band baseband circuitry 734 is connected between first band transceiver 732 and first band transceiver 748 to provide communication between these two circuits.

The second band transceiver 750 is connected to antennae 706 and 708 through duplexers 728 and 230, and diplexers 720 and 722 to send or receive data via antennae 706 and 708.

The second band transceiver 754 is connected to antennae 714 and 716 through duplexers 738 and 740, and diplexers 736 and 742 to send or receive data via antennae 714 and 716. The second band baseband circuitry 752 is connected between second band transceiver 750 and second band transceiver 754 to provide communication between these two circuits.

Diplexers 720, 722 are connected between antennae 706 and 708, and duplexers 724, 726, 728, and 730. They illustratively operate to determine which signals will be passed between antennae 706 and 708 and first band transceiver 732, and between antennae 706 and 708 and second band transceiver 750.

Diplexers 720, 722 are configured to split signals based on frequency, passing signals of a first frequency band to/from duplexers 724 and 726, and passing signals of a second frequency band to/from duplexers 728 and 730.

Duplexers 726, 728 are connected between diplexers 720, 722, and first band transceiver 732; and duplexers 728, 730 are connected between diplexers 720, 722, and second band transceiver 750. These duplexers 724, 726, 728, 730 serve to route signals of slightly different frequencies within the first or second band, respectively, to properly direct transmitted or received signals between first and second band transceivers 732 and 750 and diplexers 720, 722.

Diplexers 738, 742 are connected between antennae 714 and 716, and duplexers 738, 740, 744, and 746. They operate, for example, to determine which signals will be passed between antennae 714 and 716 and first band transceiver 748, and between antennae 714 and 716 and second band transceiver 754.

The diplexers 738, 742 are configured to split signals based on frequency, passing signals of the second frequency band to/from duplexers 738 and 740, and passing signals of the first frequency band to/from duplexers 744 and 746.

Duplexers 738, 740 are connected between diplexers 736, 742, and second band transceiver 754; and duplexers 744, 746 are connected between diplexers 736, 742, and first band transceiver 748. These duplexers 738, 740, 744, 746 serve to route signals of slightly different frequencies within the first or second band, respectively, to properly direct transmitted or received signals between first and second band transceivers 748 and 754 and diplexers 736, 742.

In alternate illustrative implementations some of duplexers 724, 726, 728, 730, 738, 740, 744, and 746, or diplexers 720, 722, 736, and 742 may be eliminated, since in some embodiments, certain permutations of band and antenna may be prohibited.

In other illustrative implementations, signals from different bands can be specifically assigned to certain transmission orientations. In such embodiments, outputs of duplexers 724, 726, 728, 730, 738, 740, 744, and 746 can be directly connected to antennae 706, 708, 714, or 716. For example, the first band could be designated to transmit/receive using a horizontal orientation, and the second band could be designated to transmit/receive using a vertical orientation.

Although the above illustrative implementations show use of only two or four antennae, along with two transceivers, this is by way of example only. Multiple-antennae, multiple-transceiver devices using different numbers of antennae or transceivers can also be used.

Furthermore, although the above illustrative implementations show antennae that are separate from a PCB, alternate embodiments could form the antennae directly on the opposite sides of the PCB. In such embodiments, insulating layers within the PCB can form the required non-conductive support members to separate the antennae from the ground plane. Also, in such embodiments the transceiver will likely be formed off of the PCB, and connected to the antennae by wiring on the PCB. This sort of integrated structure can provide for a more compact device.

Figure 8:
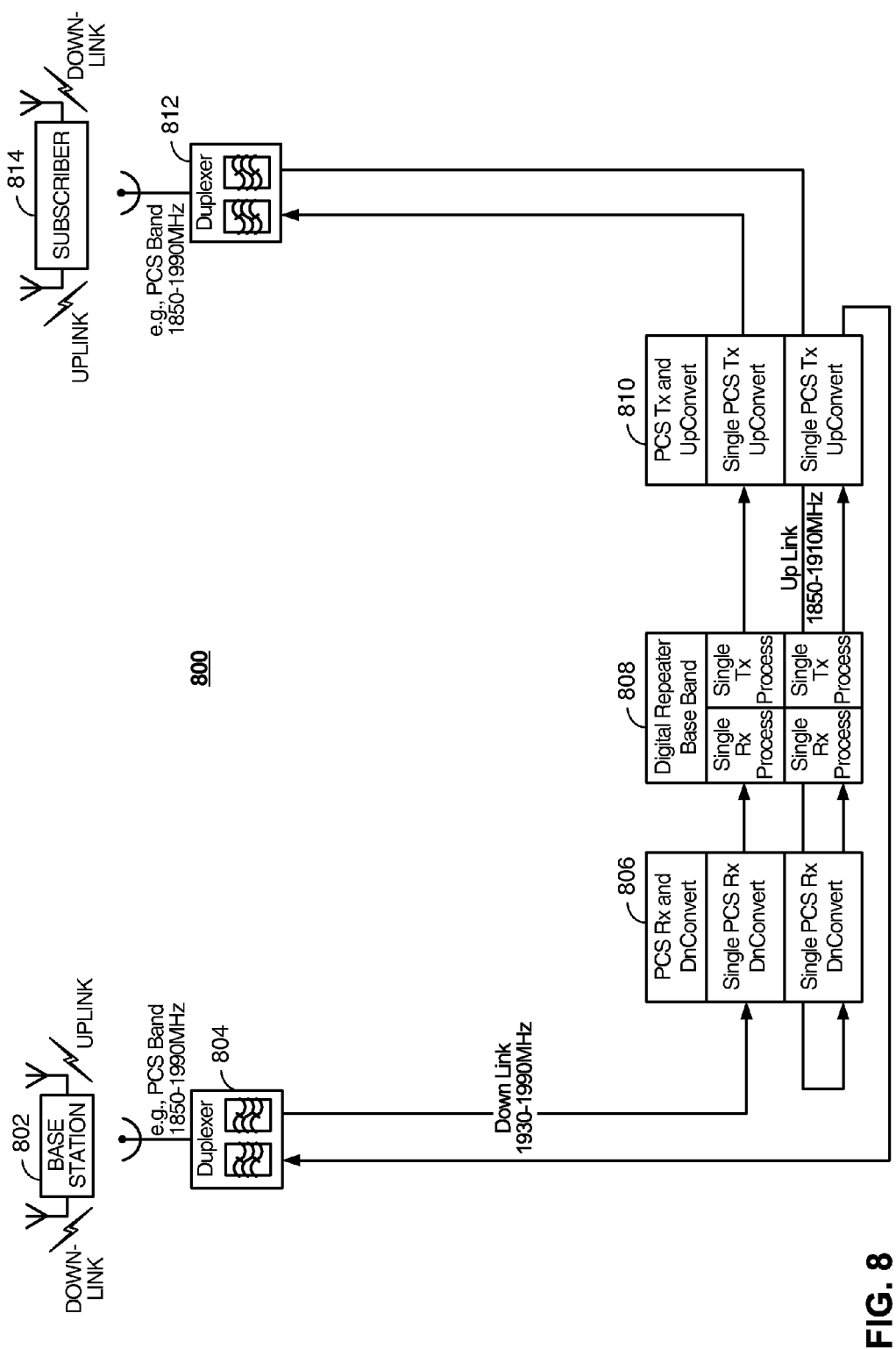
FIG. 8 is a block diagram of an exemplary FDD single band repeater having a digital interference cancellation system in accordance with the herein described systems and methods.

FIG. 8 illustrates exemplary repeater environment 800 operative to deploy an FDD single band with digital interference cancellation system in accordance with performing the exemplary method(s) described herein. As is shown, exemplary repeater environment 800 comprises duplexer 804 operatively coupled to an antenna element operative to receive signals from base station 802 and providing input signals to transceiver 806 and is operative to receive signals for processing from transceiver 8066. Further, exemplary repeater environment comprises digital repeater baseband component 808 operatively coupled to transceiver 806 and transceiver 810 which is operatively coupled to duplexer 812. In an illustrative implementation, duplexer is operatively coupled to an antenna element that allows for the communication of signals to a cooperating subscriber component 814 (e.g., mobile handset).

In an illustrative operation, as shown by the arrowed lines, the incident and transmitted signals can be processed by exemplary repeater environment 800 such that an exemplary feedback cancellation method(s) described herein.

Figure 9:
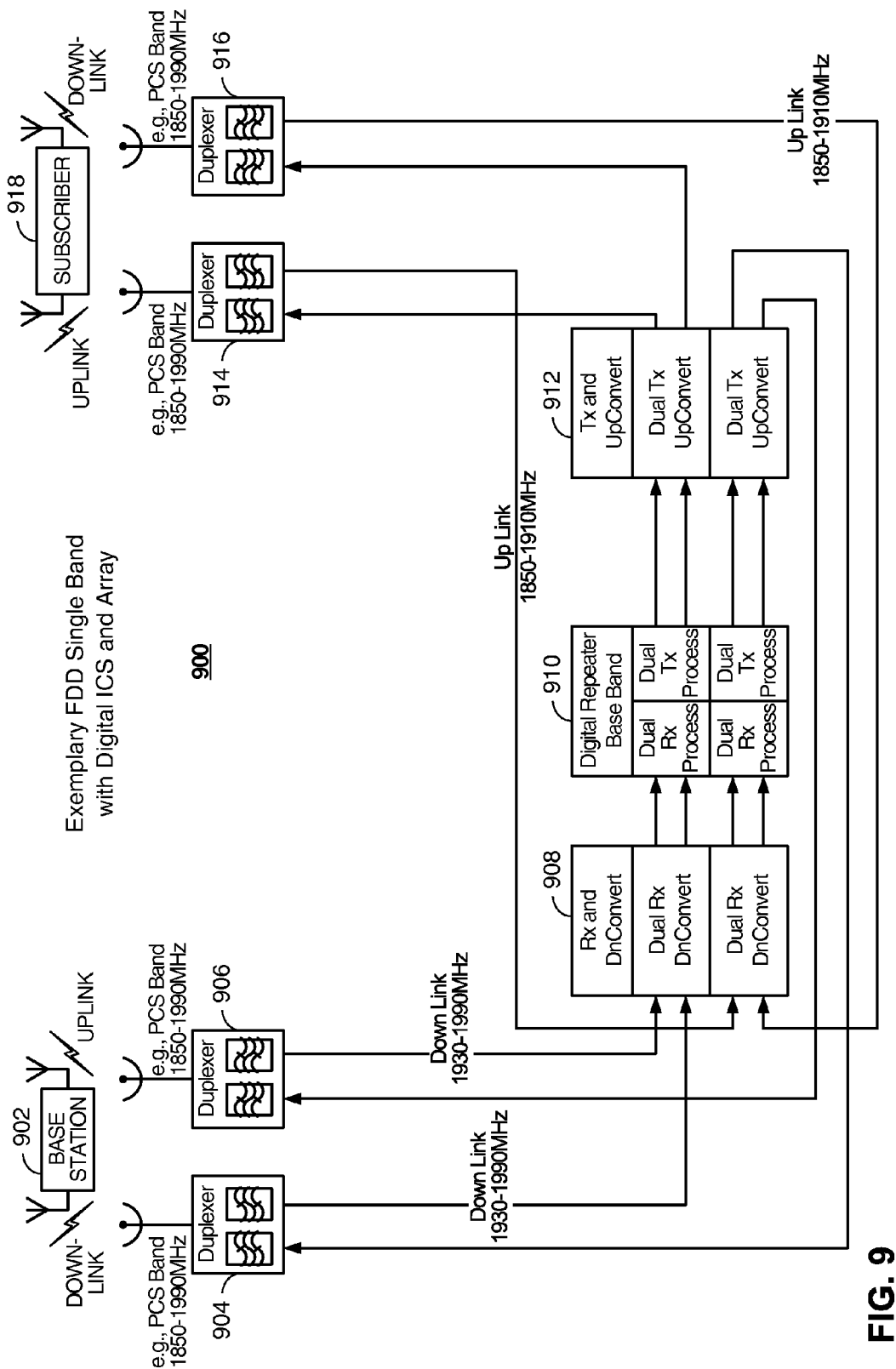
FIG. 9 is a block diagram of an exemplary FDD single band repeaters having a digital interference cancellation system and array in accordance with the herein described systems and methods.

FIG. 9 illustrates exemplary repeater environment 900 operative to deploy an FDD single band with digital interference and an antenna array in accordance with the performing the exemplary method(s) described herein. As is shown, exemplary repeater environment 900 comprises duplexers 904, 906, 914, and 916; transceivers 908 and 912; and digital repeater base band 910. Duplexers 904, 906, 914, and 96 can be operatively coupled to one or more antenna elements that can receive/transmit signals from base station 902 and subscriber component 918.

In an illustrative operation, as described by the arrowed lines, the incident and transmitted signals can be processed by exemplary repeater environment 900 according to the exemplary feedback cancellation method(s) described herein.

Figure 10:
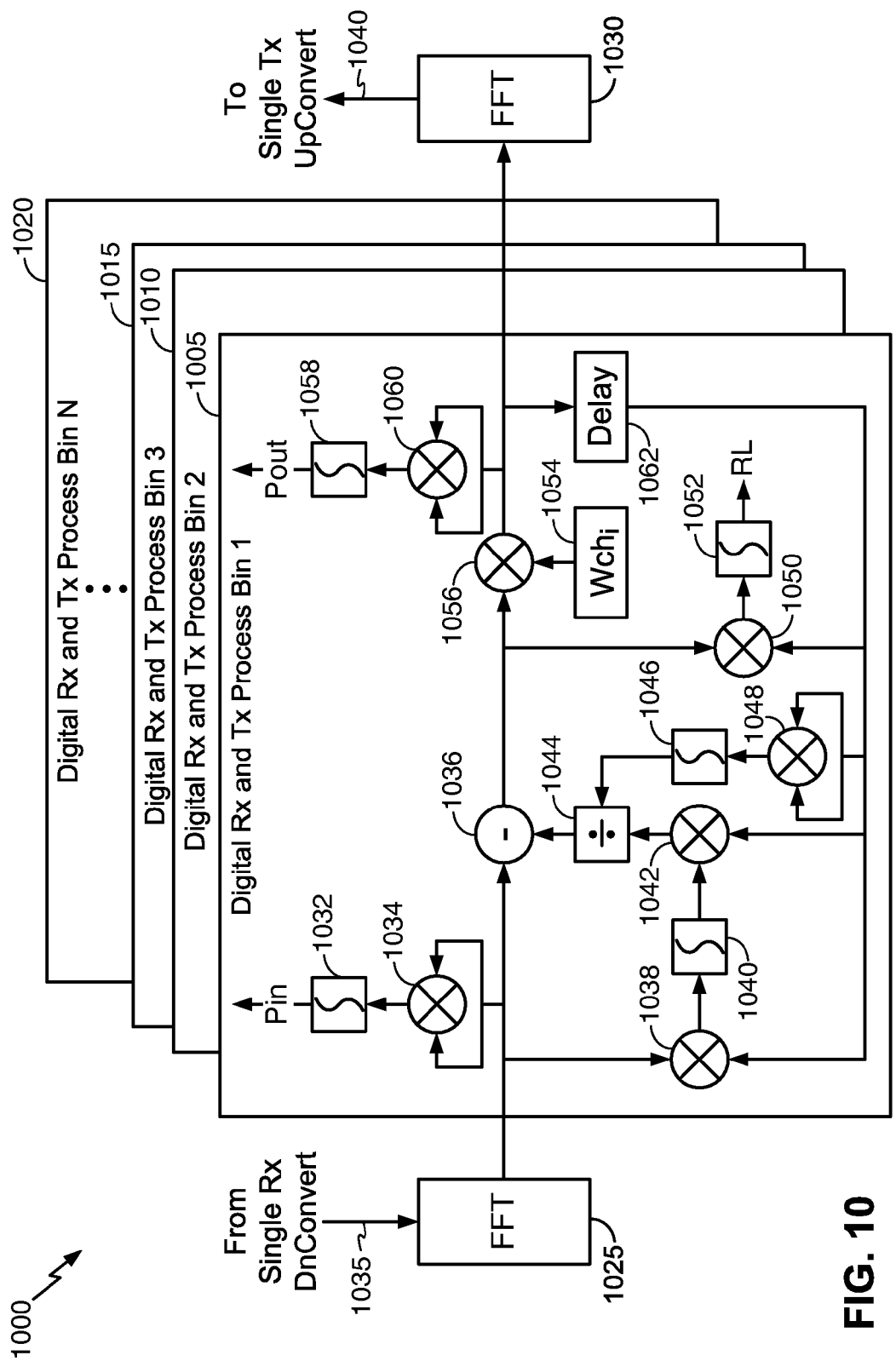
FIG. 10 is a block diagram showing the interaction of exemplary components having feedback cancellation and metric application mechanisms utilizing a filter bank approach in accordance with the herein described systems and methods.

FIG. 10 is a block diagram showing interaction of exemplary components of an illustrative repeater environment 1000 operative to perform the exemplary method(s) described in herein. FIG. 10 shows an illustrative implementation of an exemplary repeater environment 1000 deploying weighting calculations and applying metrics as part of a feedback loop cancellation technique. Exemplary repeater environment 1000 is operative to execute one or more digital receive and transmit processes bins as described by Bin 1 1005, Bin 2 1010, Bin 3 1015, up to Bin N 1020. Further, the inputs and outputs of the digital receive and transmit process bin can comprise fast Fourier transform (FFT) modules 1025 and 1030.

In an illustrative operation, signals can be incident on antenna element 1035 for processing by repeater environment 1000. The received signal can be processed according to FFT module 1025 of one or more receive and transmit process bins Bin 1 1005 to Bin N 1020, the output of which can be passed along to the input of multiplier 1038, subtraction component 1036, and multiplier component 1034. The output of multiplier component can act as input to adder component 1032 to generate selected values for use in filter bank operations. The output of subtraction block 1036 can act as input to multiplier 1056 which takes the subtracted signal (e.g., a subtraction of the output of FFT module 1025 and division module 1044) and multiply by calculated weights from weight block 1054. The output of multiplier 1056 can act as input to multiplier 1060 the output of multiplier 1060 can act as input to summer 1058 which generates a selected value for use in filter bank operations. The output of multiplier 1054 can also act as input to delay block 1062 that can provide a selected time delay to the processed signal according to one or more filter bank operations.

The output of delay block 1062 can act as input to multiplier 1038 that multiplies the time delay with the output of FFT module 1025. The output of multiplier block 1038 can act as input to adder block 1040, the output of adder block 1040 acting as input to multiplier block 1042 operative to multiply the time delay from delay block 1062 with the output of adder block 1040. The output of multiplier block 1042 can act as input to division block 1044 which can divide the output of multiplier block 1042 by the output of summer block 1046, the output of division block 1044 can act as input to subtraction block 1036. Additionally, as is shown, the output of delay block 1062 can act as input to multiplier 1050 which can multiply the time delay from delay block 1062 with the output of subtraction block 1036. The output of multiplier block 1050 can act as input of adder block 1052 that generates selected values for filter bank operations. Further, the output of delay block 1062 can act as input to multiplier 1048 which multiplies the delay block output with itself. The output of multiplier block 1048 can act as input to adder block 1046, the output of adder block 1046 can act as input to division block 1044. Additionally, the output of multiplier block 1056 can act as input to FFT block 1030 that can perform one or more inverse FFT operations. The output of FFT block 1030 can be communicated to one or more cooperating components (e.g., subscriber module) using antenna element 1040.

Figure 11:
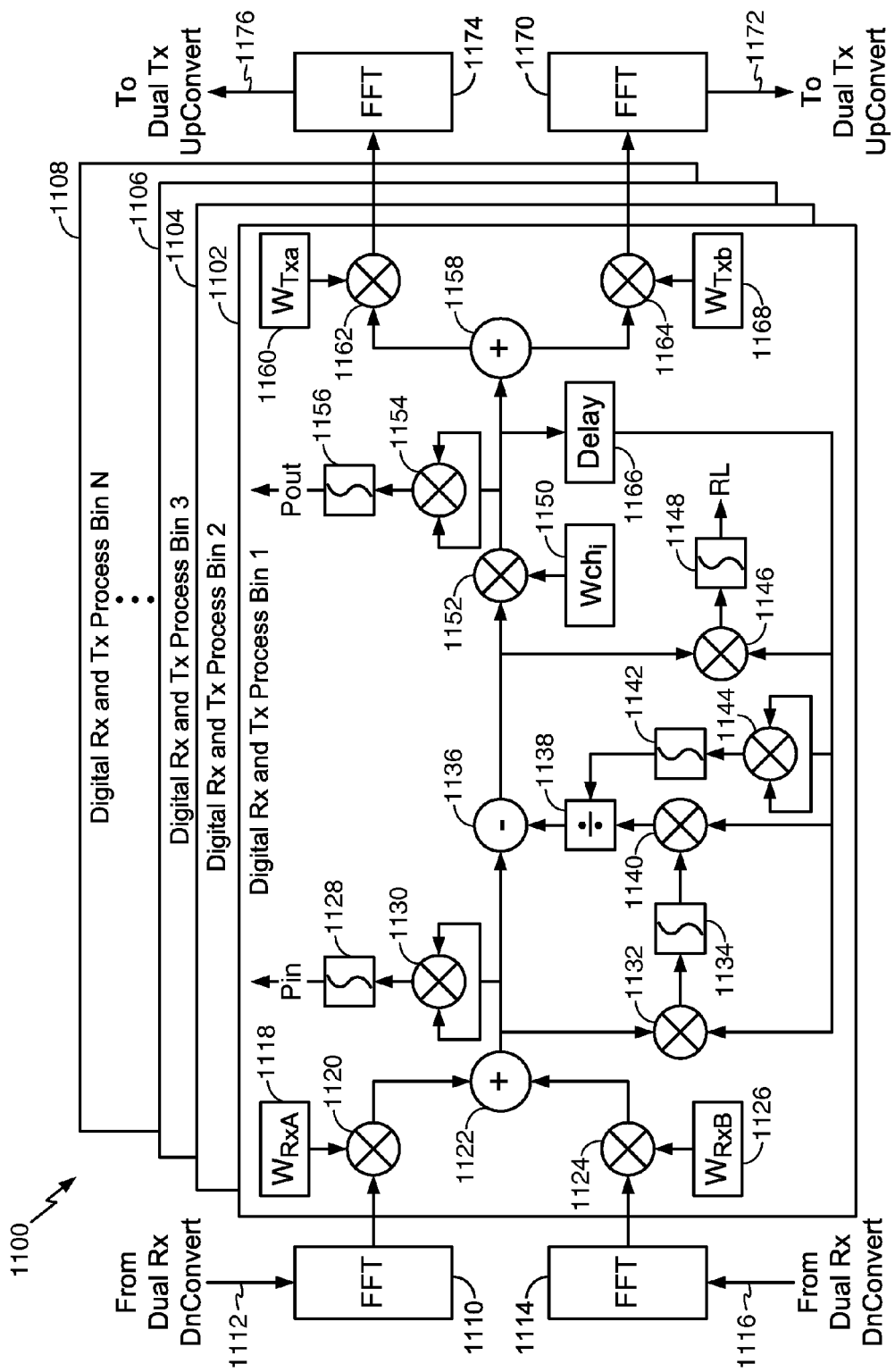
FIG. 11 is a block diagram showing the interaction of exemplary components having feedback cancellation and metric application mechanisms utilizing a filter bank approach cooperating with an antenna array adaptively in accordance with the herein described systems and methods.

FIG. 11 is a block diagram showing the interaction of exemplary components and exemplary signal pathways to perform the exemplary methods described herein as performed by exemplary repeater environment 1100. A signal can received by at least one of antenna elements 1112 and 1116 and can be processed by FFT modules 1110 or 1114, respectively. Additionally, at the output of exemplary repeater environment 1100, antenna elements 1176 and 1172 can cooperate with FFT modules 1174 and 1170, respectively. In an illustrative implementation, the multiple antenna elements 1112 and 1116 (as well as 1176 and 1172) can comprise an adaptive antenna array operable to cooperate with receive and transmit process bins Bin 1 1102, Bin 2 1104, Bin 3 1106, up to process Bin N 1108. Illustratively, the process bins can represent parallel processing of an incident signal using a filter bank approach such that that a wide band incident signal can be decomposed into one or more narrow band blocks which are processed in frequency domain according to the processing components described in each of the exemplary processing bins Bin 1 1102, Bin 2 1104, Bin 3 1106, up to Bin N 1008 and signal pathways amongst the processing components as described by the arrowed lines.

Illustratively, the processing components can comprise weight blocks 1118, 1168, 1160; multipliers 1120, 1130, 1124, 1132, 1140, 1144, 1146, 1152, 1154, 1164, and 1162; adder blocks 1128, 1134, 1148, 1142 and 1156. The processing components further include division block 1138, subtraction block 1136, and summer blocks 1122, and 1158. The illustrative processing components cooperate as shown by the arrowed lines to perform one or more methods for the execution of filter bank approach in promoting signal cancellation between the transmitter components and receiver components of exemplary repeater environment 1100.

Figure 12:
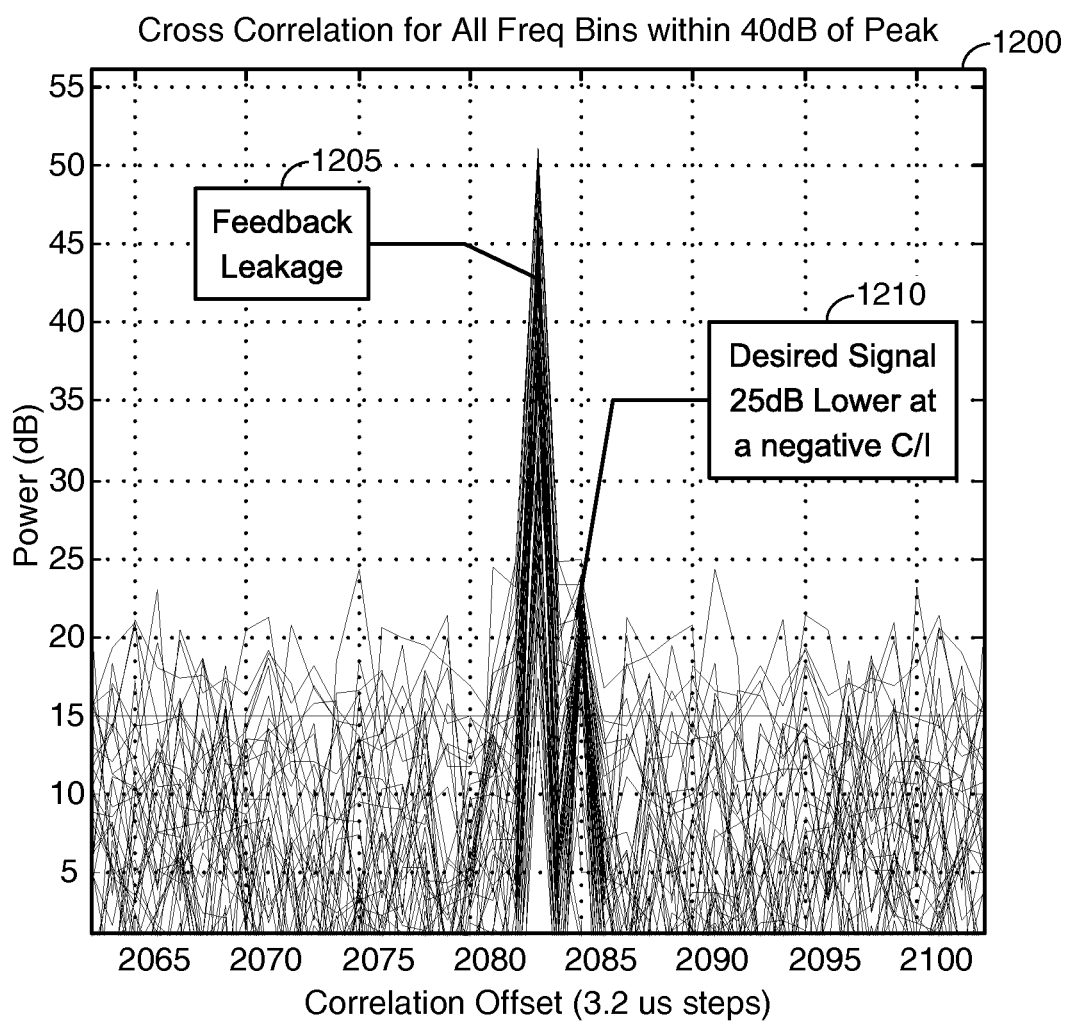
FIG. 12 is a graph diagram showing the impact of exemplary deployed feedback cancellation and metric application mechanisms in accordance with the herein described systems and methods.

FIG. 12 is graphical diagram showing the cross correlation of a plurality of frequency receive and transmit processing bins (e.g., as described in FIGS. 10 and 11). As is shown by graphical plot 1200, the feedback leakage 1205 spikes in relation to the desired signal 1210 rendering the desired signal drowned by the feedback leakage signal (e.g., signal leaking from the transmit side back to the receiver of an exemplary repeater). Illustratively, the power of the feedback leakage signal 1205 is around 50 dB where the desired signal is 1210 shown to have a power level of 25 dB. The difference between the feedback leakage signal 1205 and the desired signal 1210 can significantly impact the performance of the exemplary repeater.

Figure 13:
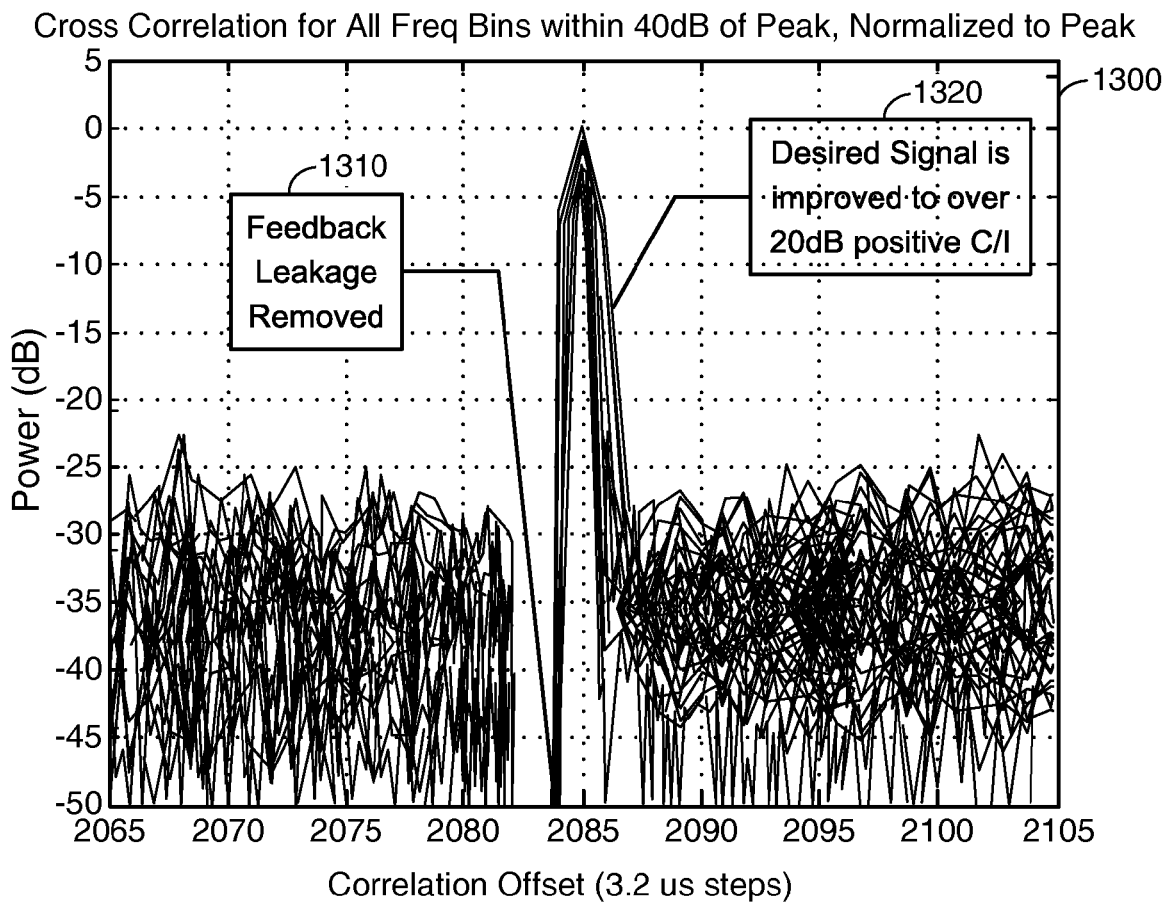
FIG. 13 is another graph diagram showing the impact of exemplary deployed feedback cancellation and metric application mechanisms in accordance with the herein described systems and methods.

FIG. 13 is a graphical diagram showing a graph plot of the performance gain realized with the application of an exemplary filter bank approach in reducing the impact of the feedback cancellation signal on an exemplary repeater environment. As is shown, in graphical plot 1300, the feedback leakage signal is removed as shown by feedback leakage removed box 1310. Additionally, the desired signal 1320 is shown to have a performance improvement of over 20 dB with the application of the filter bank feedback cancellation processing techniques described herein.

Figure 14:
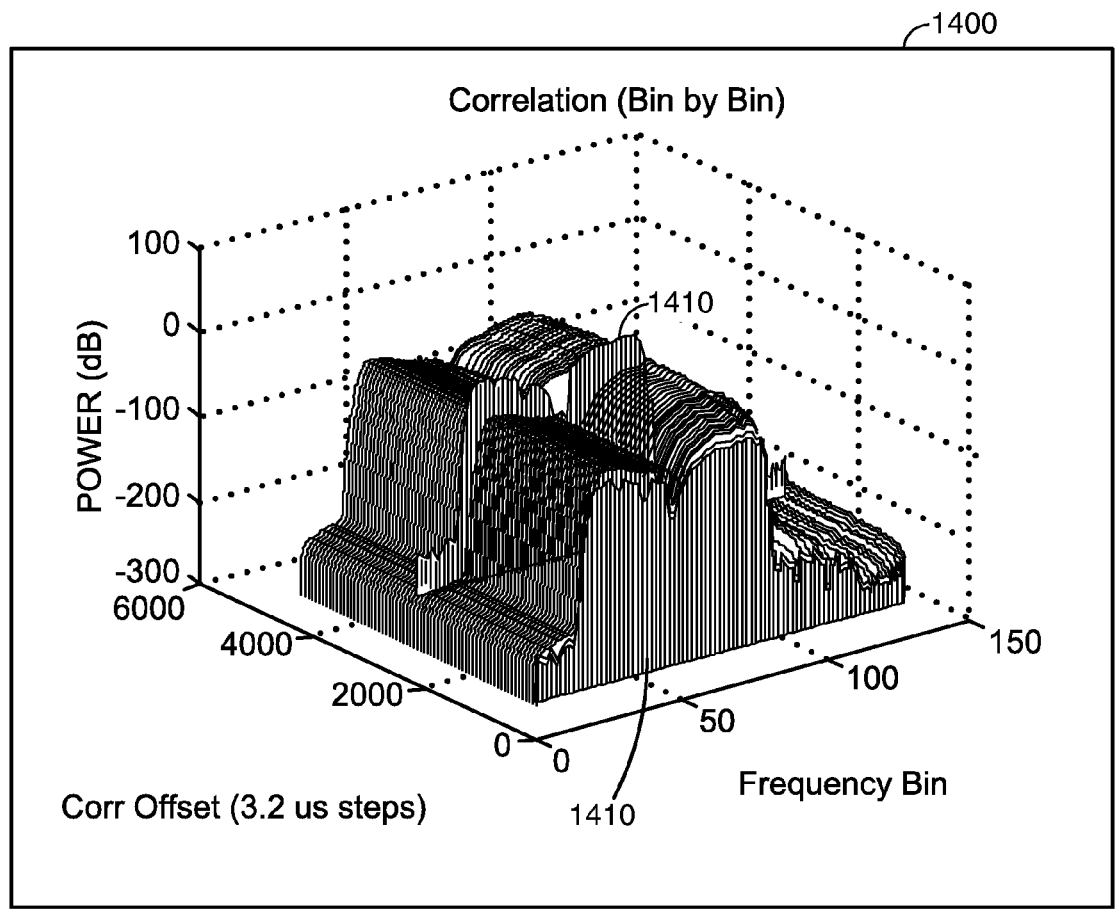
FIG. 14 is another graph diagram showing the impact of exemplary deployed feedback cancellation and metric application mechanisms in accordance with the herein described systems and methods.

FIG. 14 is a three dimensional graphical diagram showing a graph plot of the processing performed by N number of processing bins (X axis) as performed in parallel. As is shown in graphical plot 1400 an input signal 1410 can be discretely decomposed and processed in parallel bins according to the filter bank approach described herein. The decomposed signal (e.g., broken down into discrete narrow bands) can be correlated (Y axis) as is shown in FIG. 14 such that the desired signal 1410 can be processed and supported to realize performance improvement (e.g., power improvement—Z axis).

FIG. 15 is a block diagram of exemplary equations 1510 and 1520 used in performing the method(s) described herein. Exemplary equation 1510 can be used to calculate the isolation of the adaptive antenna array and exemplary equation 1520 can be used to calculate the total composite isolation realized by performing the method(s) described herein.

Figure 16:
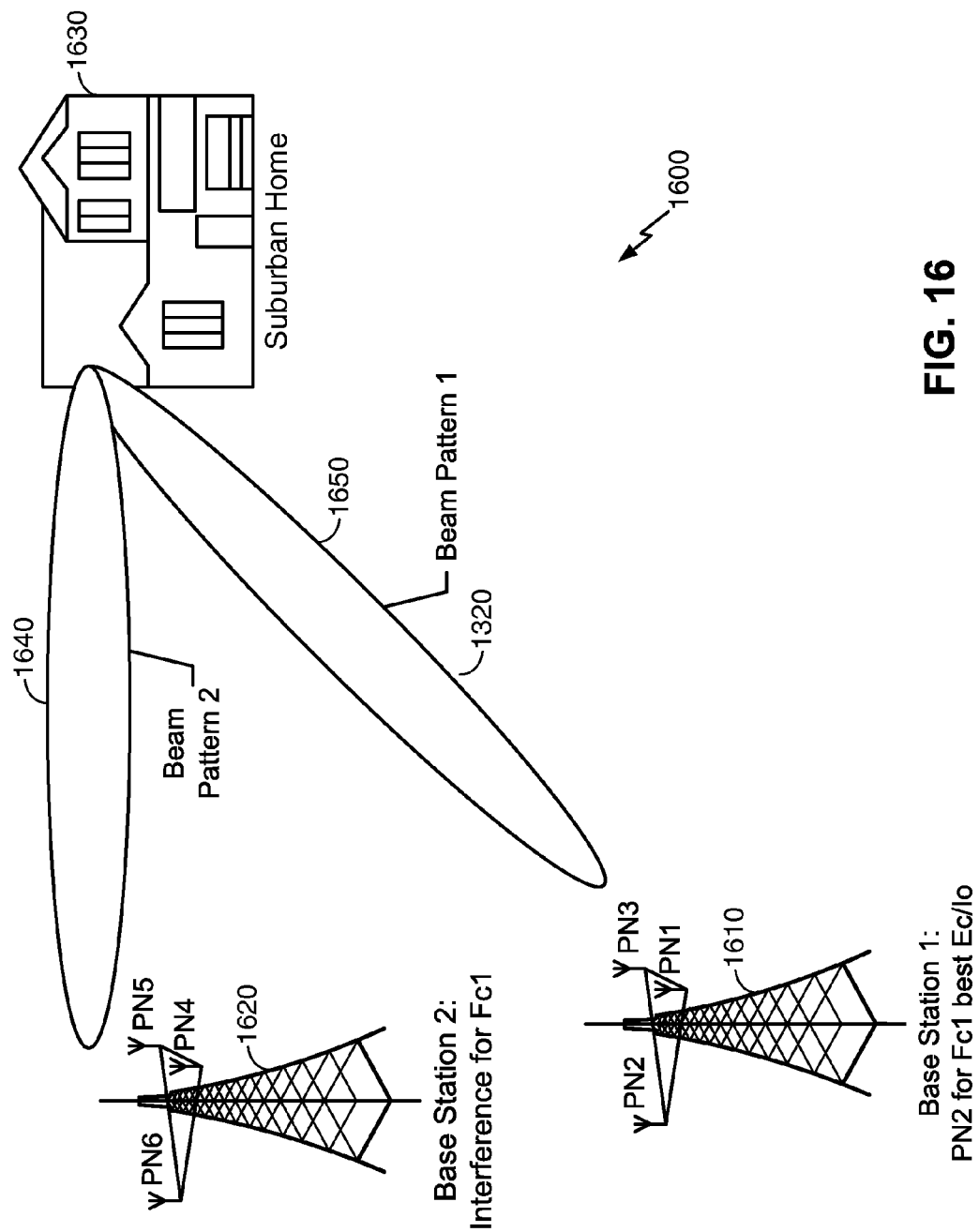
FIG. 16 is block diagram of an exemplary communications environment where composite metrics can be deployed to optimize signal strength and integrity.

FIG. 16 is a block diagram of an exemplary wireless communications environment allowing for beam forming for an exemplary repeater. As is shown, wireless communications environment comprise base station 1610, base station 120, domiciled repeater environment 1630, and beam patterns 1640 and 1650. Operatively, base station 1610 and 1620 can have multiple carriers assigned to it. That is, base station 1610 could have F1, F2, . . . , Fn carriers transmitting at the same time. Base station 1620 could have also have the same carriers transmitting if they are within the same cellular network. If the beam former is implemented using a filter band approach, then multiple beams can be steered to each base station at different frequencies. Exemplary selected steering algorithms can optimize to the strongest Ec/Io for each carrier. It is possible that while base station 1610 at F1 PN1 had the strongest Ec/Io and that is optimized by the herein described method(s) over base station 1620, for F2 it could be that base station 1620 has the better Ec/Io for F2 and in that case the beam for F2 would be pointed at base station 1620 and base station 1610 would tend to have a null steered towards that.

Figure 17:
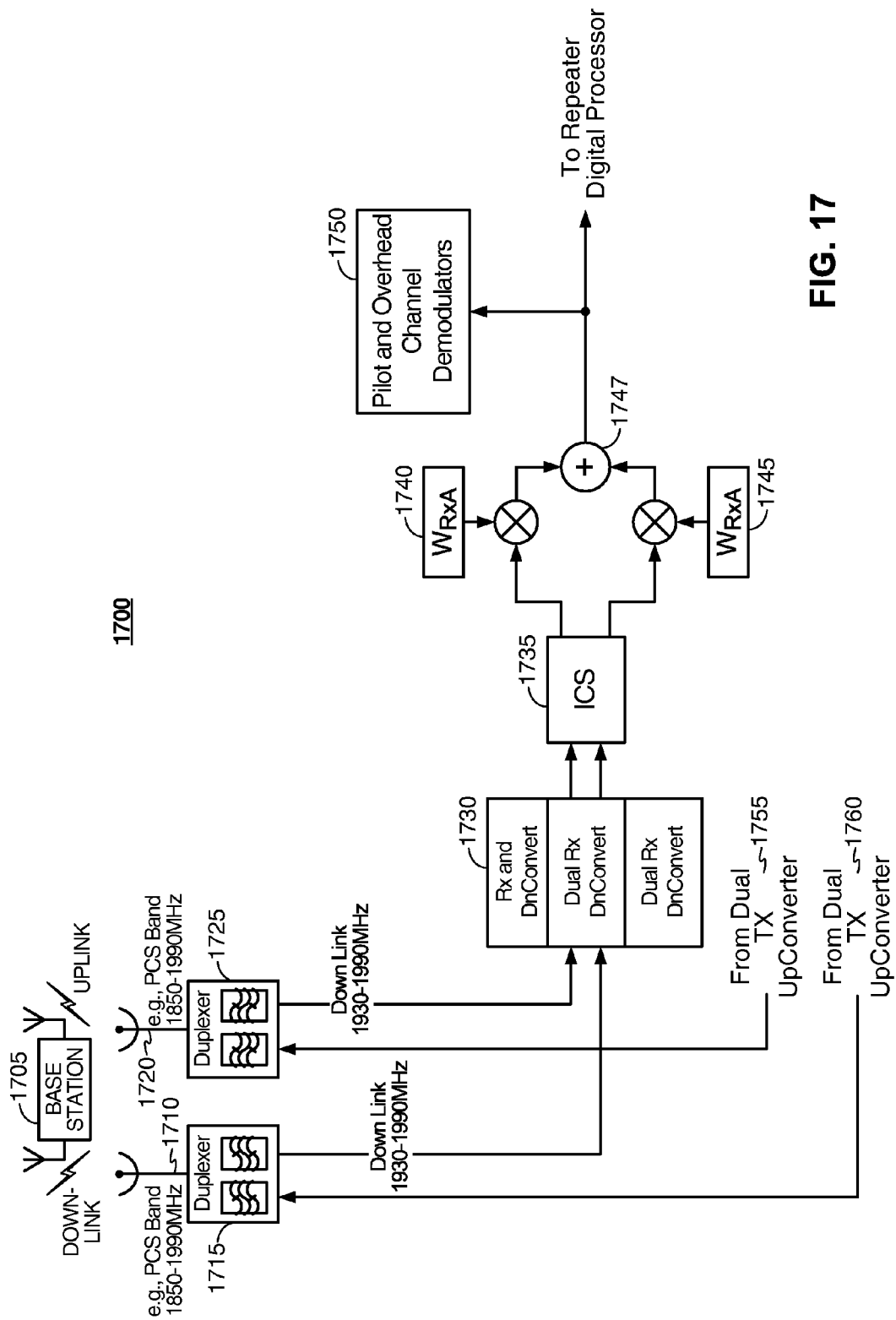
FIG. 17 is a block diagram of an exemplary FDD single band with parallel pilot and overhead channel demodulator in accordance with the herein described systems and methods.

FIG. 17 is a block diagram showing an exemplary FDD single band with parallel pilot and overhead channel demodulator. As is shown, exemplary repeater environment 1700 comprises antenna elements 1710 and 1720, duplexers 1715 and 1725, dual receive and down-converters 1730, interference cancellation system 1735, weight blocks and multipliers 1740 and 745, adder block 1747, and pilot overhead channel demodulators 1750.

In an illustrative operation, a signal can be received by antenna elements 1710 and 1720 for processing by duplexers 1715 and 1725 that can operatively duplex signals from transmitter up-converters sources 1755 and 1760. The output of duplexers 1715 and 1725 are processed by dual receiver down-converters 1730 for cancellation by interference cancellation system 1735. The output of interference cancellation system 1735 can operatively be multiplied with weights from weight blocks 1740 and 1745 which can then be added and processed by pilot and overhead channel demodulators 1750.

Figure 18:
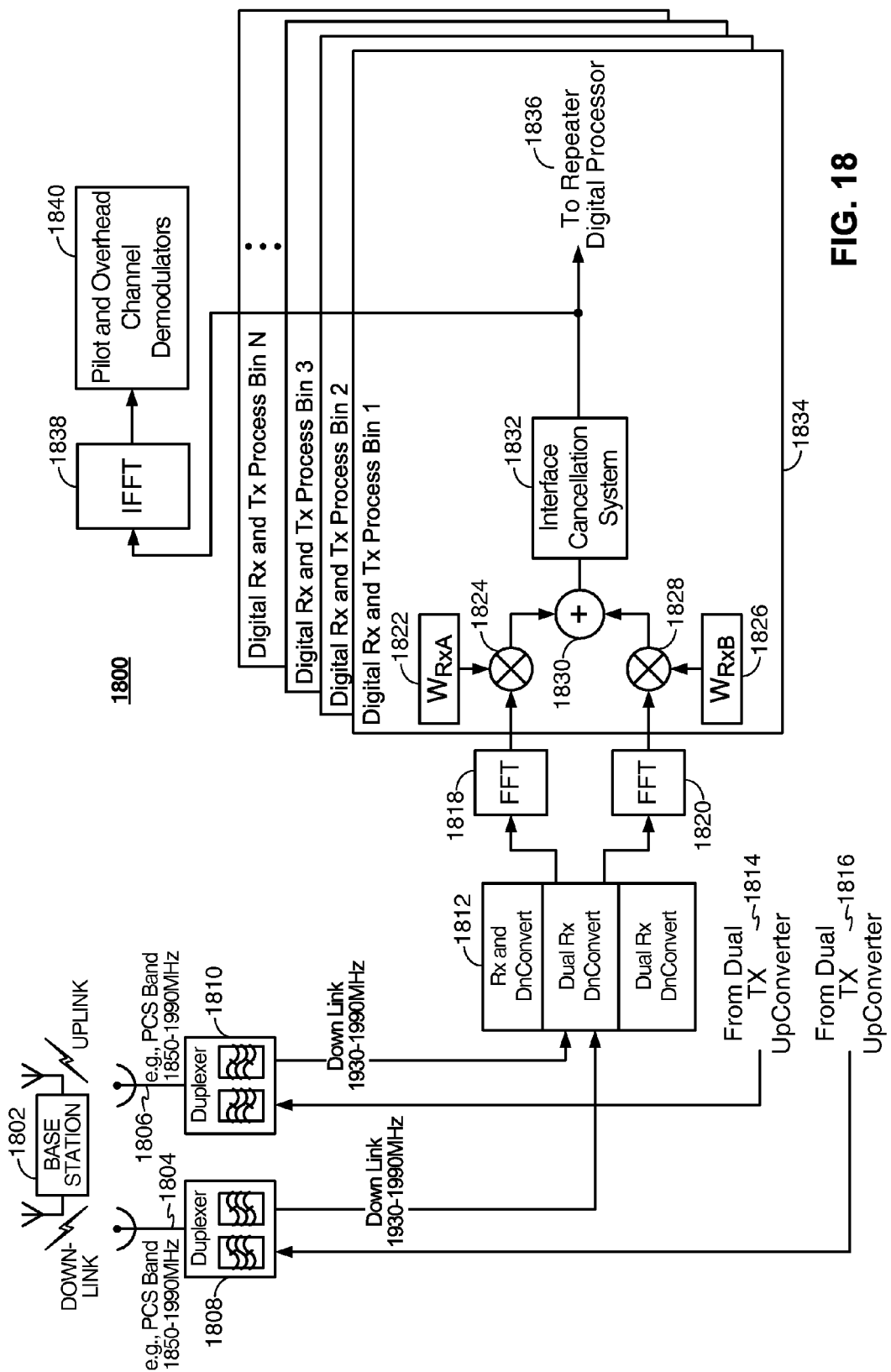
FIG. 18 is a block diagram of an exemplary FDD single band with parallel pilot and overhead channel demodulator using filter bank approach.

FIG. 18 is a block diagram showing an exemplary FDD single band with parallel pilot and overhead channel demodulator using a filter bank approach to accomplish the method (s) described herein. As is shown, exemplary repeater 1800 comprises base station 1802, antenna elements 1804 and 1806, duplexers 1808 and 1810, dual receiver down-converters 1812, cooperating dual up-converter source 1814, cooperating dual down-converter source 1816, fast Fourier transform blocks 1818 and 1820, digital receive and transmit process bins 1834 comprising weight components 1822 and 1826, multipliers 1828, adder component 1830, interference cancellation system 1832, inverse FFT block 1838, pilot and overhead channel demodulators 1840, and output tap 1836 to provide and receive instructions from an exemplary repeater digital processor.

In an illustrative operation, signals provided by base station 1802 can be received by antenna elements 1804 and 1806 (e.g., adaptive antenna array) for processing by duplexer 1808 and 1810. Duplexer 1810 can also receive signals from dual transmit up-converter 1814, and duplexer 1808 can receive signals from dual transmit up-converter 1816 for duplex operations. The output of duplexers 1808 and 1810 can act as input to transceiver 1812, the output of transceiver dual receiver down converters can act as input to FFT modules 1818 and 1820. The output of FFT modules 1818 and 1820 can then be multiplied by selected weights provided by weight blocks 1822 and 1826, respectively and then added according to adder block 1830 on a bin-by-bin (e.g., filter bank approach) basis as shown by bins 1834. The output of the adder block 1830 acts as input to interference cancellation system 1832 which is then processed by inverse FFT block 1838. The output of IFFT block 1838 acts as input to pilot and overhead channel demodulators 1840. Additionally, the output of ICS 1832 can be provided to repeater digital processor 1836.

Figure 19:
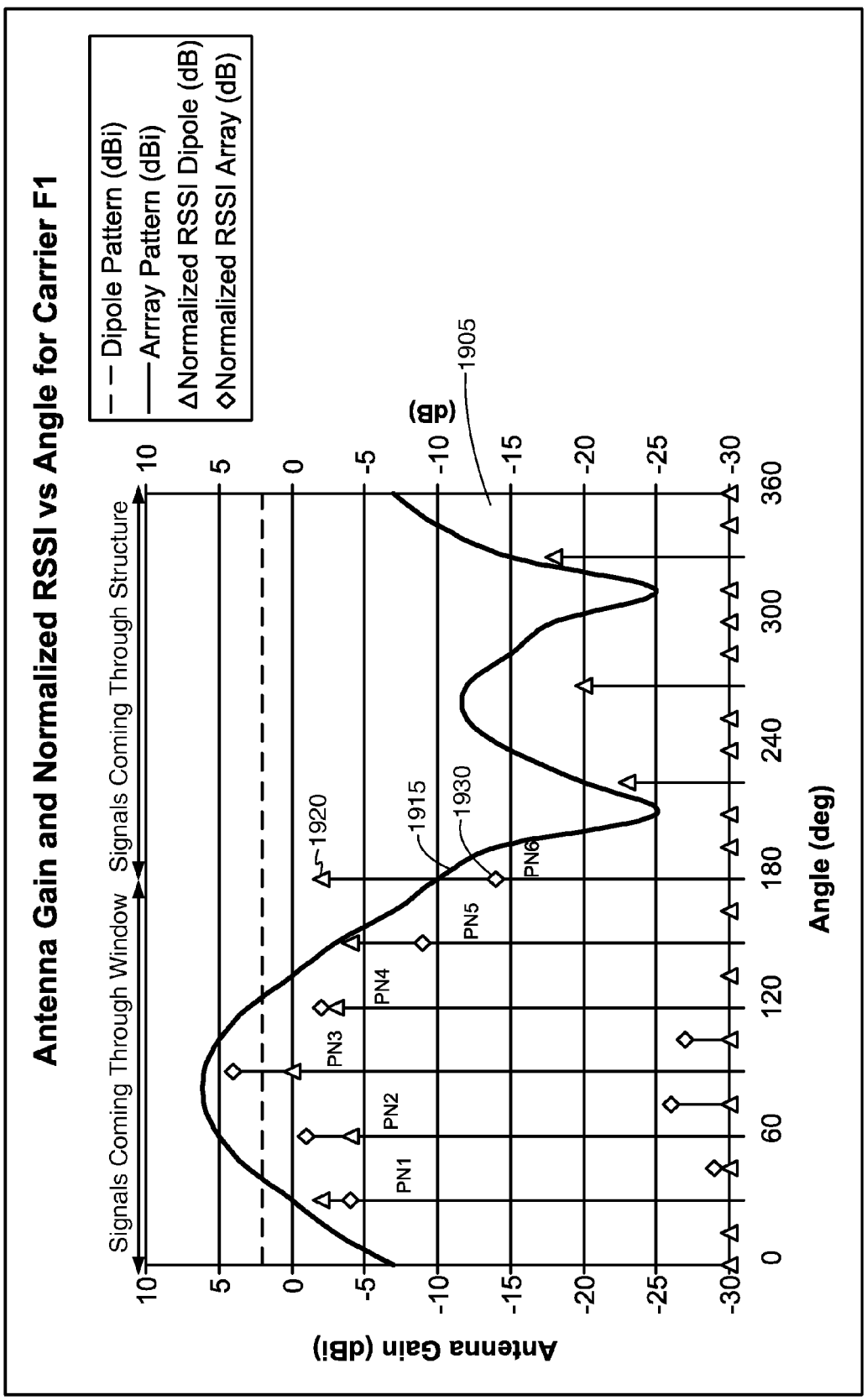
FIG. 19 is a graphical plot of the antenna gain and normalized received signal strength indication versus angle for a carrier in accordance with the herein described systems and methods.

FIG. 19 depicts graphical plot 1905 which depicts an illustrative scenario found in a typical cellular environment. Graphical plot 1905 shows the angle of arrival (AoA) of different PN Offsets from various base stations on F1 and the relative power of the each of these signals if received by a standard 2 dBi dipole (dipole antenna pattern 1910 versus angle plotted on graph). The triangle tipped arrows 1920 are the relative powers received by the dipole plotted on the right Y axis in dB's. The diamond tipped arrows 1930 are the relative power if received with an array having the gain versus angle shown on the plot. This is an example with the repeater placed in a window with angle 0-180 facing outside and 180-360 facing inside. As can be seen, the PN's received from 180 to 360 are much lower because they are coming through the house from presumably a base station on the opposite side of the house. In this example, an exemplary repeater processor operatively searched and determined that PN3 had the strongest power initially. From there it optimized Ec/Io of PN3 and the plotted array pattern 1915 is the result. As can be seen, the signal power of the chosen PN3 received by the array is larger than the signal if received by a dipole by the difference in the gain between the two antennas. Likewise, the power of most of the other interferers (the other PN offsets) is reduced such that the triangle tipped signals are higher than the diamond tipped signals. Thus, the array improved the desired signal PN3 and lowered the undesireable PN's relative to a dipole.

Figure 20:
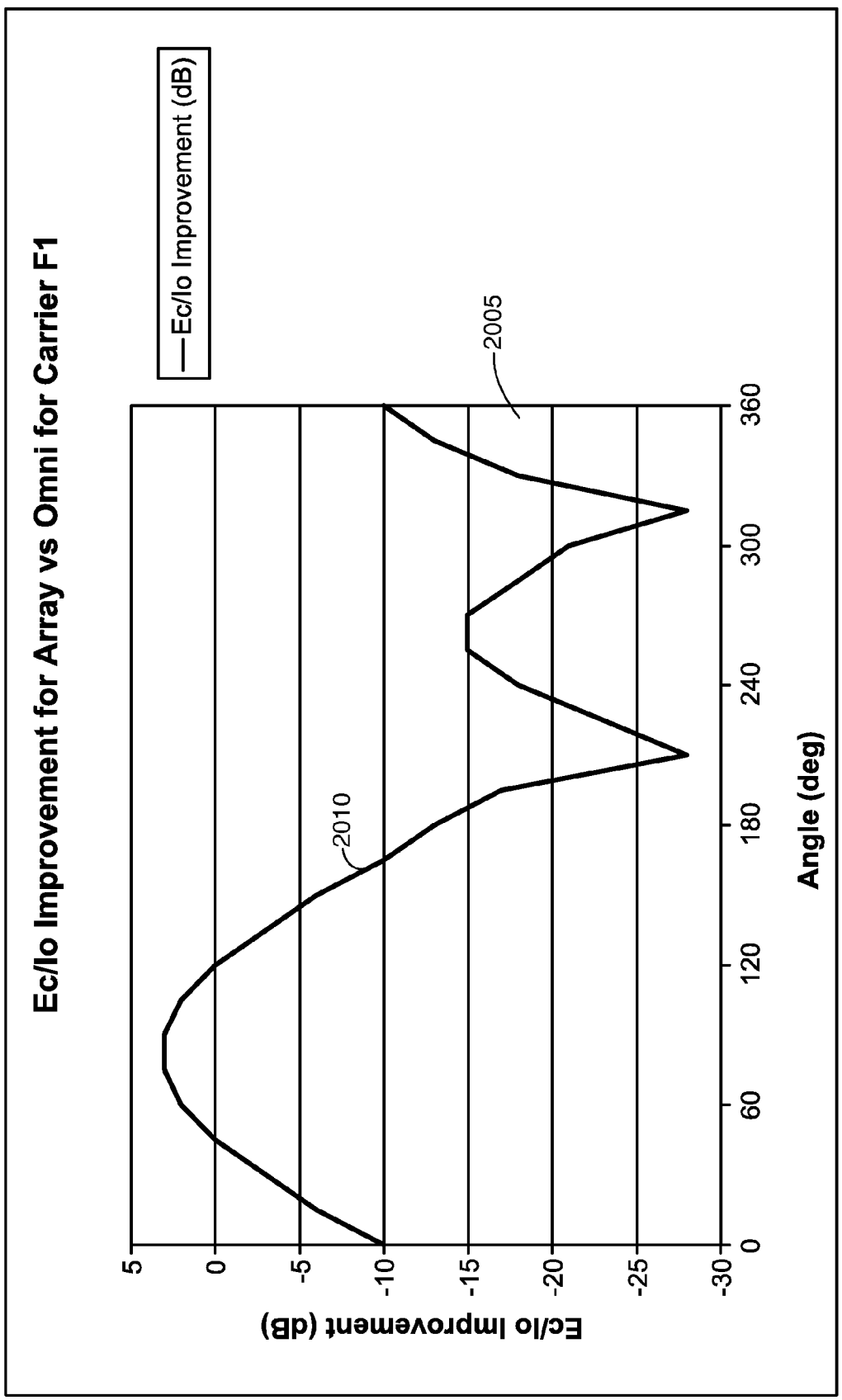
FIG. 20 is a graphical plot of the improvement of Ec/Io for an array for a carrier in accordance with the herein described systems and methods.

FIG. 20 shows a graphical plot 2005 that depicts the Ec/Io improvement versus angle for this particular steering of the array for the given PN AoA 1210. As can be seen the Ec/Io on the desired PN at 90 degree AoA is better than 3 dB. The overall amount of improvement can be heavily influenced by the AoA of the PNs.

Figure 21:
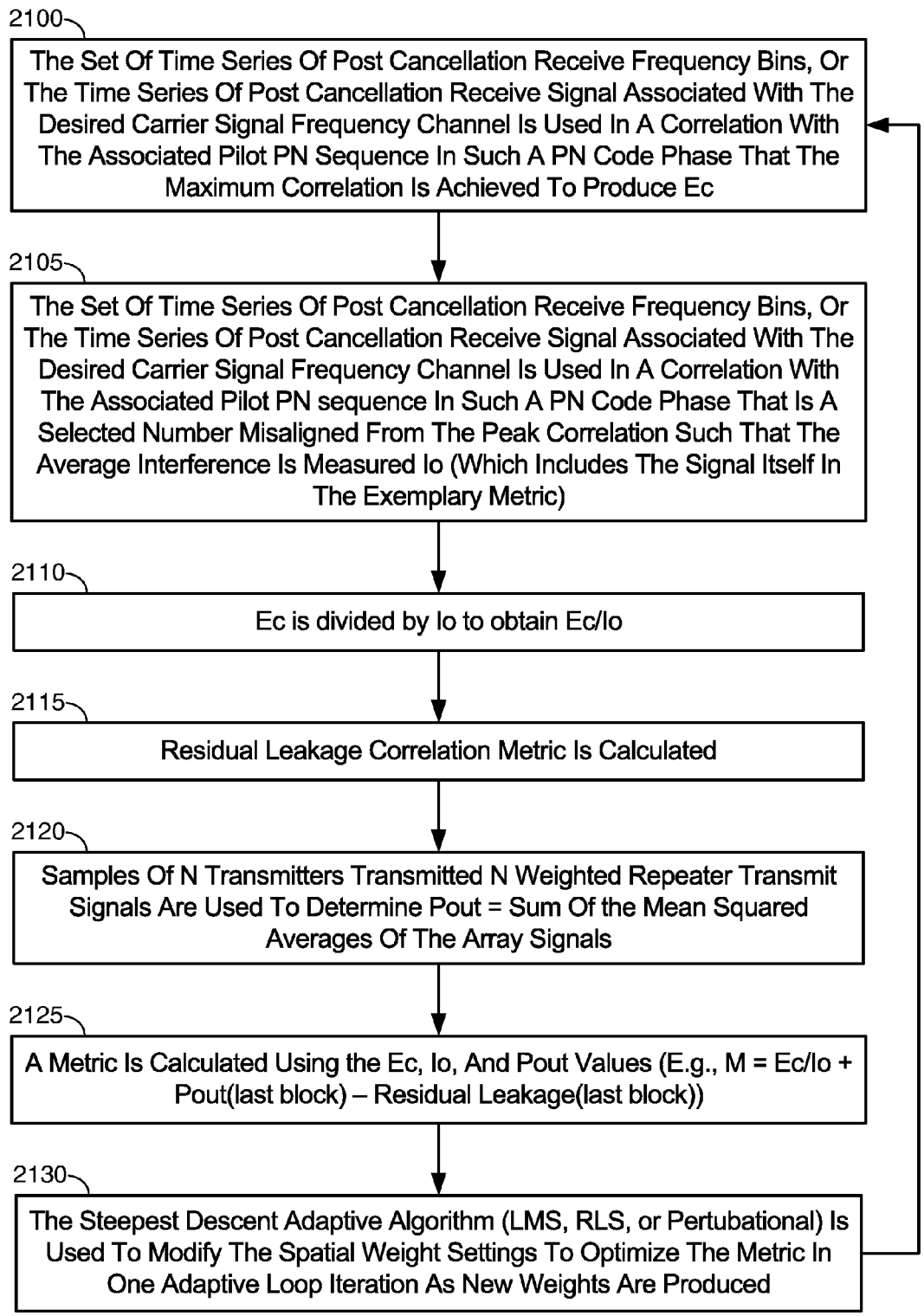
FIG. 21 is a flow diagram of the processing performed in deploying a composite metric for use by an adaptive array in accordance with the herein described systems and methods.
Figure 22:
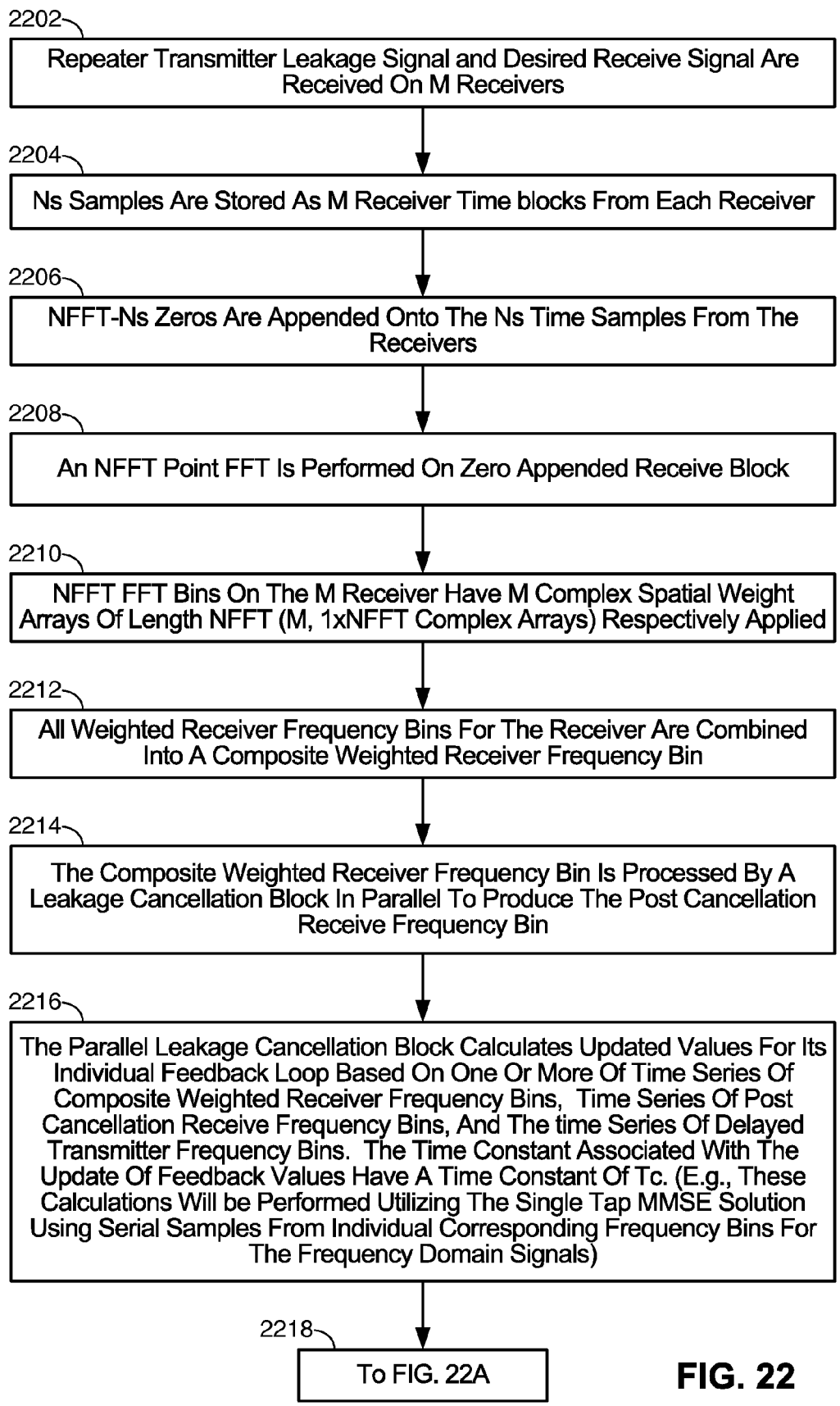
FIGS. 22 and 22A are flow diagrams of an exemplary method performed when deploying a filter bank approach to improve signal cancellation.
Figure 22A:
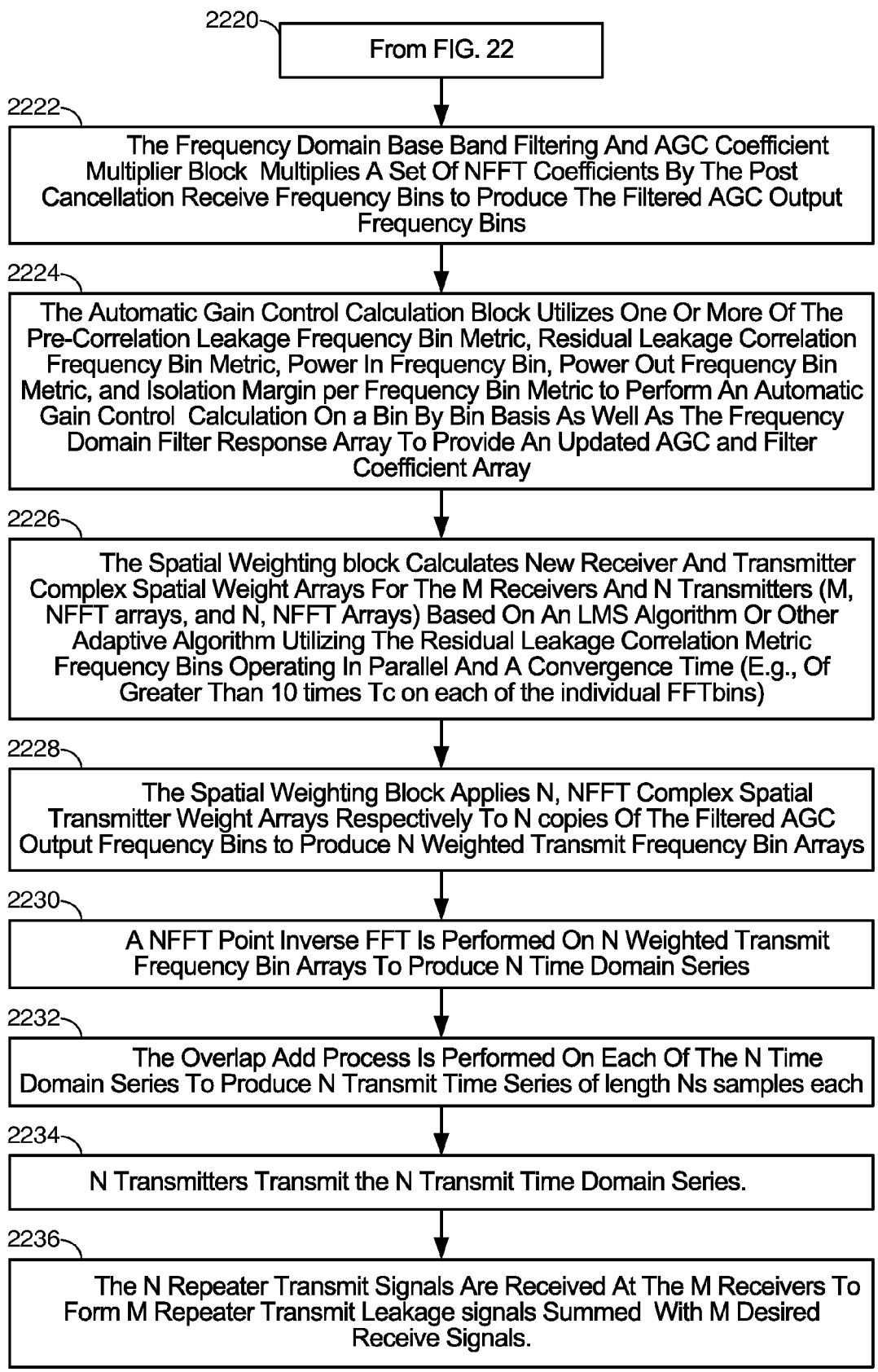
Figure 23:
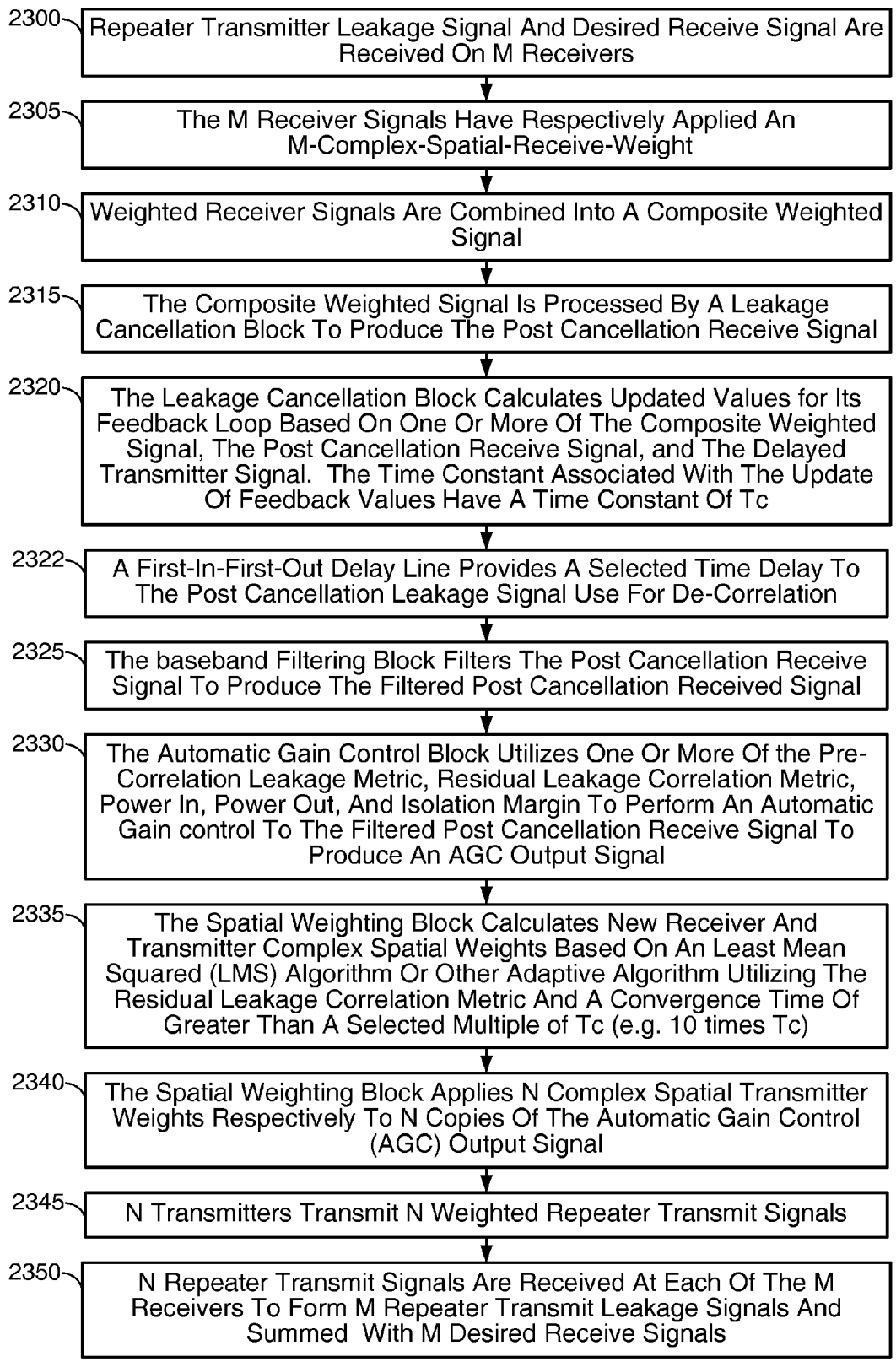
FIG. 23 is a flow diagram of an exemplary method performed when deploying an adaptive array in cooperation with a equalized canceller to improve signal cancellation.

FIG. 21 is a flow diagram of exemplary processing performed when deploying an adaptive array in conjunction with one or more composite metrics as described in FIGS. 22, 22A, and 23. In an illustrative implementation, the method depicted in FIG. 21 can described the calculation of new spatial weights using a modified metric for use in steering an exemplary antenna array to achieve pilot pollution management, SNR improvement, or increased isolation. As is shown, processing begins at block 2100 where the set of time series of post cancellation receive frequency bins, or the time series of post cancellation receive signals associated with the desired carrier signal frequency channel is used in a correlation with the associated pilot PN sequence in such a PN code phase that the maximum correlation is achieved to produce Ec. Processing then proceeds to block 2105, where the set of time series of post cancellation frequency bins, or the time series of post cancellation receive signal associated with he desired carrier signal frequency channel is used in a correlation with he associated pilot PN sequence in such a PN code phase that is a selected number of samples misaligned from the peak correlation such that the average interference is measured as Io e.g., which included the signal itself in the exemplary metric). Processing then proceeds to block 2110 where the calculated Ec is divided by the Io to obtain Ec/Io values. Residual leakage correlation metric is calculated at block 2115. Samples of N transmitters transmitted N weighted repeater transmit signals are then used at block 2120 to determine the power out value (e.g., Pout) which can be represented by the sum of the mean squared averages of the array signals. A metric is then calculated at block 2125 using the Ec, Io, and Pout values represented as M=Ec/Io+Pout(last block)−residual leakage (last block). From there, processing proceeds to block 2130 where the steepest descent adaptive algorithm (LMS, RLS, or pertubational) is used to modify the spatial weight settings to optimize the metric in one adaptive loop iteration as new weights are produced. Processing then reverts back to block 2100 and continues from there.

FIG. 22 is a flow diagram of exemplary processing performed in the application of a filter bank when performing feedback cancellation. Processing begins at block 2202 where repeater transmitter leakage signals and desired receive signals are received on M receivers. Processing then proceeds to block 1204 where $N_s$ number of samples are stored as M number of receiver time blocks from the receivers. Zero-padding then is applied at block 2206 where NFFT—Ns zeros are appended onto the Ns time samples from the receivers. An NFFT point FFT is then performed on the zero appended receive block at block 2208. Complex spatial weights arrays of length NFFT (e.g., M, 1×NFFT complex arrays) are applied on the NFFT bins on the M receiver at block 2210. Processing then proceeds to block 2212 where the weighted receiver frequency bins for the receiver are combines into a composite weighted receiver frequency bin. The composite weighted receiver frequency bin is processed by a leakage cancellation block in parallel to produce the post cancellation receiver frequency bin at block 2214. Processing then proceeds to block 2216 where the parallel leakage cancellation block can calculate updated values for its individual feedback loop based on one or more of time series of composite weighted receiver frequency bins, time series of post cancellation receive frequency bins, and time series of delayed transmitter frequency bins. Illustratively, the time constant associated with the update of feedback values can illustratively maintain a time constant of Tc. In the illustrative implementation, the calculations of the updated values calculated by the parallel leakage cancellation block can be performed by utilizing the single tap MMSE solution using serial samples from individual corresponding frequency bins for the frequency domain signals). Processing continues to FIG. 15A as described by block 2218.

FIG. 22A is a flow diagram describing the continuation of the processing described in a FIG. 22. As is shown processing continues from block 2218 of FIG. 22 at block 2220 and proceeds. From block 2220, processing continues to block 2222 where the frequency domain base band filtering and AGC coefficient multiplier block multiplies a set of NFFT coefficients by the post cancellation receive frequency bins to produce the filtered AGC output frequency bins. Processing then proceeds to block 2224 where the automatic gain control calculation block utilized one or more of the pre-correlation leakage frequency bin metric, residual leakage correlation frequency bin metric, power in frequency bin, power out frequency bin metric, and isolation margin per frequency bin metric to perform an automatic gain control calculation on a bin by bin basis as well as the frequency domain filter response array to provide an updated AGC and filter coefficient array. Processing proceeds to block 2226 where the spatial weighting block calculates new receiver and transmitter complex spatial weights arrays for the M receivers and N transmitters (M, NFFT arrays, and N, NFFT arrays) based on an LMS algorithm or other adaptive algorithm utilizing residual leakage correlation metric frequency bins operating in parallel and a convergence time (e.g., of greater than 10 times Tc on each of the individual FFT bins). The spatial weighting block applies N, NFFT complex spatial transmitter weight arrays respectively to N copies of the Filtered AGC output frequency bins to produce N weighted transmit frequency bin arrays at block 2228. A NFFT point inverse FFT is then performed at block 2230 on N weighted transmit frequency bin arrays to produce N time domain series. Processing then proceeds to block 2232 where an overlap add process is performed on each of the N time domain series to produce N transmit time series of length $N_s$ each. The N repeater transmit signals transmitted at block 2234 are then received at block 2236 at the M number of receivers to form M repeater transmit leakage signals summed with the M desired receive signals.

FIG. 23 is a flow diagram of an exemplary method performed by an exemplary repeater environment deploying a feedback cancellation loop adaptively coupled to an antenna array having an applied metric to improve isolation. As is shown, processing begins at block 2300 where a repeater transmitter leakage signal and desired received signal are received on M number of receivers. From there processing proceeds to block 2305 where the M receiver signals have respectively applied to them an M-complex-spatial-receive weight. Processing proceeds to block 2310 where the weighted receiver signals are combined into a composite weighted signal. The composite weighted signal is processed by a leakage cancellation block to produce a post cancellation receive signal at block 2315. At block 2320, leakage cancellation block calculates updated values for its feedback loop based on one or more of the composite weighted signal, the post cancellation receive signal, and the delayed transmitter signal. In an illustrative implementation, the time constant associated with the update of feedback values can be considered to have a time constant Tc. A first-in-first-out (FIFO) delay line can then provide a selected time delay to the post cancellation leakage signal for use in de-correlating the transmit leakage signal from the receive signal at block 2322. Illustratively, the FIFO delay can be alternatively provided as a composite delay derived from the operation of an exemplary feedback cancellation loop cooperating with one or more a cooperating repeater components comprising a filter component, an automatic gain control component, and other components providing beneficial operations in the repeating process such that the processing performed by one or more of these components as summed up provides sufficient time delay such that upon retransmission of the signal a delay ensures de-correlation between the transmitter leakage signal and the receive signal in the desired antenna elements. Generally, this composite delay is a multiple of the inverse of the bandwidth of the signals being repeated.

The baseband filtering block filters the post cancellation receive signal to produce a filtered post cancellation received signal at 2325. At 2330, the automatic gain control block utilized one or more of the pre-correlation leakage metric, residual leakage correlation metric, power in, power out, and isolation margin to perform an automatic gain control to the filtered post cancellation receive signal to produce an automatic gain control output signal. Processing then proceeds to 2340 where a spatial weighting block applies N complex spatial transmitter weights respectively to N copies of the automatic gain control (ACG) output signal. The N weighted repeater transmit signals are then transmitted by the N transmitters to at 2345 and are received at each of the M receivers at 2350 to form M repeater transmit leakage signals and are summed with the M desired receive signals to provide feedback cancellation operations.

Figure 24:
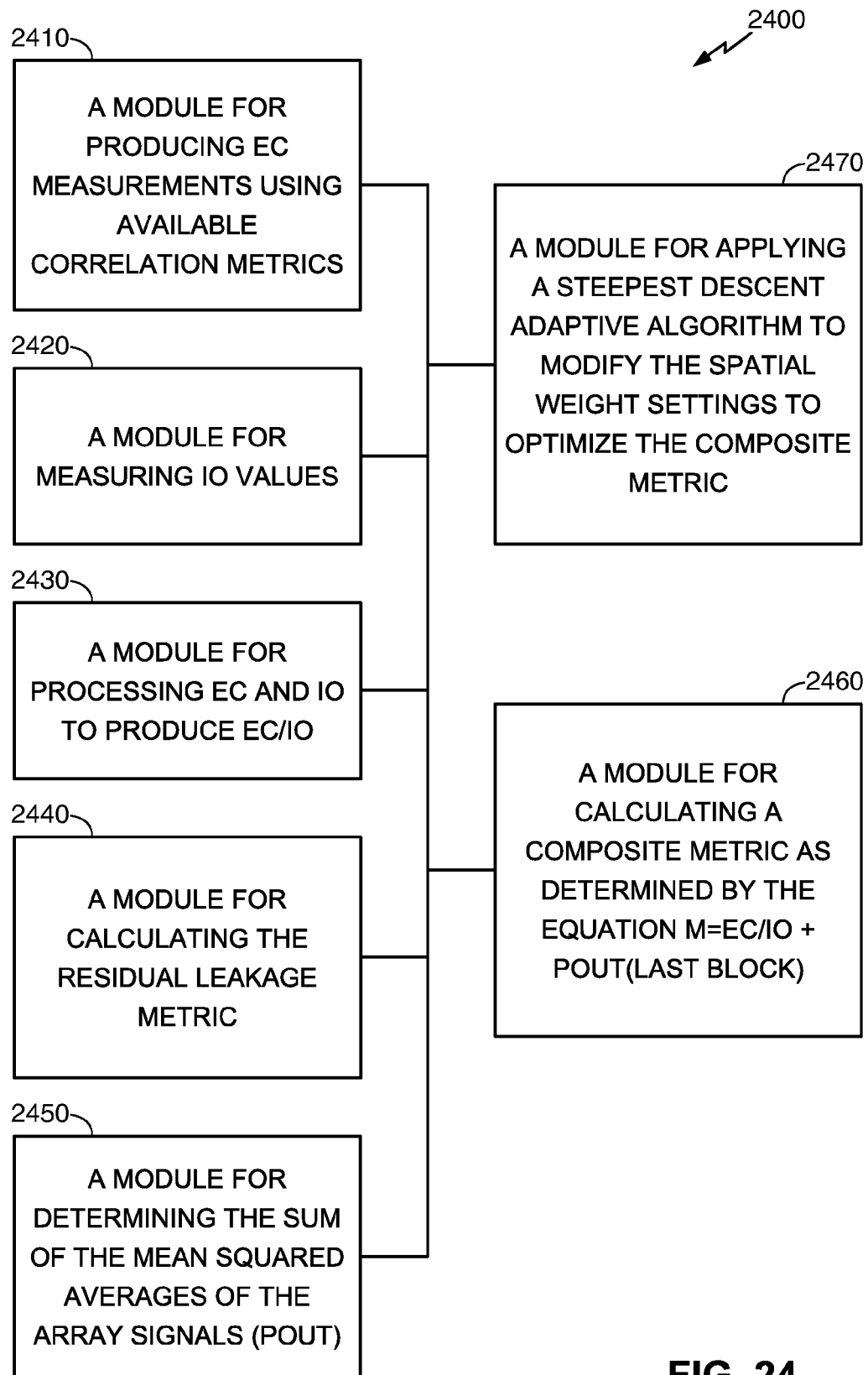
FIG. 24 is a block diagram of an exemplary repeater system for deploying a composite metric approach with an adaptive array and exemplary canceller in accordance with the herein described systems and methods.

FIG. 24 illustrates a system 2400 that facilitates feedback loop cancellation in a repeater environment. The system includes a module 2410 for producing Ec values using available correlation metrics; a module 2420 for measuring Io; a module 2420 for measuring Io; a module 2430 for processing Ec and Io to produce Ec/Io; a module 2440 for calculating the residual leakage metric; a module 2450 for determining the sum of the mean squared averages of the array (Pout); a module 2460 for calculating a metric as determined by the equation M=Ec/Io+Pout (last block); and a module 2470 for applying a steepest descent adaptive algorithm to modify the spatial weight settings to optimize the composite metric.

The systems and methods for efficiently representing knowledge of the herein described systems and methods may also be applied to the context of resolving in memory data on the same provider. In such context, the in memory data may not be backed by a physical store, e.g., it might be used in a graph solver on the CPU to synchronize nodes. The herein described systems and methods may also be applied in the context of scene graphs, especially as they become more distributed on multi-core architectures and calculations are written directly to an in memory data structure such as a volumetric texture.

There are multiple ways of implementing the present herein described systems and methods, e.g., an appropriate API, tool kit, driver code, operating system, control, standalone or downloadable software object, etc. which enables applications and services to use the systems and methods for representing and exchanging knowledge in accordance with the herein described systems and methods. The herein described systems and methods contemplate the use of the herein described systems and methods from the standpoint of an API (or other software object), as well as from a software or hardware object that performs the knowledge exchange in accordance with the herein described systems and methods. Thus, various implementations of the herein described systems and methods may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the herein described systems and methods have been described in connection with various computing devices and network architectures, the underlying concepts may be applied to any computing device or system in which it is desirable to synchronize data with another computing device or system. For instance, the synchronization processes of the herein described systems and methods may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the herein described systems and methods, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the herein described systems and methods. In the case of program code execution on programmable computers, the computing device generally includes a processor, a storage medium readable by the processor (including volatile and non-volatile memory and/or storage elements), at least one input device, and at least one output device. One or more programs that may implement or utilize the synchronization services and/or processes of the herein described systems and methods, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the herein described systems and methods may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the herein described systems and methods. When implemented on a general-purpose processor, the program code combines with the processor to provide a unique apparatus that operates to invoke the functionality of the herein described systems and methods. Additionally, any storage techniques used in connection with the herein described systems and methods may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIG. 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the herein described systems and methods has been described in connection with the preferred embodiments of the various figures, it is to be understood that other similar embodiments may be used or modifications and additions may be made to the described embodiment for performing the same function of the herein described systems and methods without deviating therefrom. For example, while exemplary network environments of the herein described systems and methods are described in the context of a networked environment, such as a peer to peer networked environment, one skilled in the art will recognize that the herein described systems and methods are not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the herein described systems and methods in the context of particular programming language constructs, the herein described systems and methods are not so limited, but rather may be implemented in any language to provide methods for representing and exchanging knowledge for a set of nodes in accordance with the herein described systems and methods. Still further, the herein described systems and methods may be implemented in or across a plurality of processing chips or devices, and storage may similarly be effected across a plurality of devices. Therefore, the herein described systems and methods should not be limited to any single embodiment, but rather should be construed in breadth and scope in accordance with the appended claims.

What is claimed is:

1. A repeater for a wireless communication network, the repeater operative to provide feedback cancellation comprising: a metric module configured to perform calculations for weights used by the repeater, and to generate a composite metric derived from metric execution of one or more of an adaptive algorithm, beam forming, and filter bank approach; and an adaptive antenna array cooperating with the metric module to condition signals as part of calculating the composite metric to improve the feedback cancellation; further comprising producing a pilot energy measurement using one or more repeater values comprising a set of time series of one or more post cancellation receive frequency bins, time series of post cancellation receive signal associated with the desired carrier signal frequency channel; further comprising measuring the average interference as a correlation of one or more repeater values comprising a set of time series of one or more post cancellation receive frequency bins, time series of post cancellation receive signal associated with the desired carrier signal frequency channel and a cooperating wireless communication channel value to generate the average interference value, the average interference value described as the non-correlated energy of the wireless communication channel.

2. The repeater as recited in claim 1, further comprising pilot and overhead channel demodulators for use in one or more operations to allow for signal isolation and improvement in the quality of one or more of a pilot channel and overhead channel.

3. The repeater as recited in claim 1, wherein the filter bank approach calculation comprise minimum mean squared error (MMSE) calculations.

4. The repeater as recited in claim 1, further comprising one or more fast Fourier transform (FFT) modules operative to convert an input signal to the repeater from the time domain to the frequency domain.

5. The repeater as recited in claim 4, further comprising one or more FFT modules operative to transform a conditioned frequency domain signal conditioned according to one or more operations to a time domain series.

6. The repeater as recited in claim 1, wherein the repeater is a Time Division Duplex repeater and the wireless communication network is one of a Wireless-Fidelity (Wi-Fi), and Worldwide Interoperability for Microwave Access (Wi-max) network.

7. The repeater as recited in claim 1, wherein the repeater is a Frequency Division Duplex repeater and the wireless communication network is one of a cellular, Global System for Mobile communications (GSM), Code Division Multiple Access (CDMA), and ThirdGeneration (3G) network.

8. The repeater as recited in claim 1, wherein the reception and/or transmission antennas comprise one or more of dipole antennas and patch antennas.

9. The repeater as recited in claim 1, wherein the calculation module comprises digital logic to manage, control, monitor, and direct the metric module calculations.

10. The repeater as recited in claim 1, wherein the filter bank calculations are performed by executing a linear algebra algorithm comprising minimum mean squared error (MMSE) algorithm, maximum signal-to-noise ration algorithm, and linear constrained minimum variance algorithm.

11. A method to promote signal integrity in a digital repeater environment comprising: producing pilot energy measurements representative using available correlation metrics; measuring non-correlated energy values; calculating the residual leakage metric; determining the total transmitted power from the repeater; calculating a metric that is a function of one or more of the pilot energy measurements, non-correlated energy values, residual leakage metric, and output power of the repeater to generate a composite metric; and applying a steepest descent adaptive algorithm to modify the spatial weight settings to optimize the composite metric to improve feedback cancellation; further comprising producing a pilot energy measurement using one or more repeater values comprising a set of time series of one or more post cancellation receive frequency bins, time series of post cancellation receive signal associated with the desired carrier signal frequency channel; further comprising measuring the average interference as a correlation of one or more repeater values comprising a set of time series of one or more post cancellation receive frequency bins, time series of post cancellation receive signal associated with the desired carrier signal frequency channel and a cooperating wireless communication channel value to generate the average interference value, the average interference value described as the non-correlated energy of the wireless communication channel.

12. The method as recited in claim 11, further comprising processing a selected number of transmitter transmitted weighted repeater signals to determine the transmitted power output.

13. The method as recited in claim 11, further comprising summing the mean squared averages of array signals to generate the power output value.

14. The method as recited in claim 11, further comprising repeating the steps of the method of claim 11 across the input signal.

15. The method as recited in claim 11, further comprising selecting a number representative of the degree of misalignment between a selected channel value and the peak correlation.

16. A non-transitory computer readable medium having stored thereon computer executable instructions for performing at least the following acts: producing pilot energy measurements; measuring non-correlated energy values; calculating the residual leakage metric; determining the sum of the mean squared averages of an array of signals; calculating a metric that is a function of one or more of the pilot energy measurements, non-correlated energy values, residual leakage metric, and output power of the repeater to generate a composite metric; and applying a steepest descent adaptive algorithm to modify the spatial weight settings to optimize the composite metric to improve feedback cancellation; further comprising producing a pilot energy measurement using one or more repeater values comprising a set of time series of one or more post cancellation receive frequency bins, time series of post cancellation receive signal associated with the desired carrier signal frequency channel; further comprising measuring the average interference as a correlation of one or more repeater values comprising a set of time series of one or more post cancellation receive frequency bins, time series of post cancellation receive signal associated with the desired carrier signal frequency channel and a cooperating wireless communication channel value to generate the average interference value, the average interference value described as the non-correlated energy of the wireless communication channel.

17. A processor, comprising a memory having stored thereon computer executable instructions to cause the processor to performing at least the following acts: producing pilot energy measurements representative using available correlation metrics; measuring non-correlated energy values; calculating the residual leakage metric; determining the sum of the mean squared averages of an array of signals; calculating a metric that is a function of one or more of the pilot energy measurements, non-correlated energy values, residual leakage metric, and output power of the repeater to generate a composite metric; and applying a steepest descent adaptive algorithm to modify the spatial weight settings to optimize the composite metric to improve feedback cancellation; further comprising producing a pilot energy measurement using one or more repeater values comprising a set of time series of one or more post cancellation receive frequency bins, time series of post cancellation receive signal associated with the desired carrier signal frequency channel; further comprising measuring the average interference as a correlation of one or more repeater values comprising a set of time series of one or more post cancellation receive frequency bins, time series of post cancellation receive signal associated with the desired carrier signal frequency channel and a cooperating wireless communication channel value to generate the average interference value, the average interference value described as the non-correlated energy of the wireless communication channel.

18. A system that facilitates feedback loop cancelation in a repeater environment comprising: means for receiving transmitter leakage signal and receive signal at M number of receivers; means for performing an FFT on M zero appended receive block from M receivers to produce M sets of frequency bins; means for applying M complex spatial weight arrays respectively to the M number of sets of frequency bins; means for combining the weighted frequency bins into a composite signal; means for producing a post cancellation receive frequency bin; means for applying an inverse FFT on N weighted transmit frequency bin arrays to produce N time domain series; means for transmitting N number of transmit time domain series; and means for receiving N number of repeater transmit signals at M number of receivers to form M number repeater transmit leakage signals summed with M number of received signals; further comprising producing a pilot energy measurement using one or more repeater values comprising a set of time series of one or more post cancellation receive frequency bins, time series of post cancellation receive signal associated with the desired carrier signal frequency channel; further comprising measuring the average interference as a correlation of one or more repeater values comprising a set of time series of one or more post cancellation receive frequency bins, time series of post cancellation receive signal associated with the desired carrier signal frequency channel and a cooperating wireless communication channel value to generate the average interference value, the average interference value described as the non-correlated energy of the wireless communication channel.

19. A method for facilitating feedback loop cancelation in a repeater environment comprising: receiving transmitter leakage signal and receive signal at M number of receivers; performing an FFT on M zero appended receive block from M receivers to produce M sets of frequency bins; applying M complex spatial weight arrays respectively to the M number of sets of frequency bins; combining the weighted frequency bins into a composite signal; producing a post cancellation receive frequency bin; applying an inverse FFT on N weighted transmit frequency bin arrays to produce N time domain series; transmitting N number of transmit time domain series; and receiving N number of repeater transmit signals at M number of receivers to form M number repeater transmit leakage signals summed with M number of received signals; further comprising producing a pilot energy measurement using one or more repeater values comprising a set of time series of one or more post cancellation receive frequency bins, time series of post cancellation receive signal associated with the desired carrier signal frequency channel; further comprising measuring the average interference as a correlation of one or more repeater values comprising a set of time series of one or more post cancellation receive frequency bins, time series of post cancellation receive signal associated with the desired carrier signal frequency channel and a cooperating wireless communication channel value to generate the average interference value, the average interference value described as the non-correlated energy of the wireless communication channel.

* * * * *